United States Patent
Blard et al.

(10) Patent No.: US 6,334,521 B1
(45) Date of Patent: Jan. 1, 2002

(54) CLUTCH MECHANISM PROVIDED WITH AN ENDLESS SCREW WEAR TAKE-UP DEVICE

(75) Inventors: Michel Blard, Issy-les-Moulineaux; André Dalbiez, Argenteuil; Jacques Thirion de Briel, Colombes, all of (FR)

(73) Assignee: Valeo, Paris (FR)

( * ) Notice: Subject to any disclaimer, the term of this patent is extended or adjusted under 35 U.S.C. 154(b) by 0 days.

(21) Appl. No.: 09/555,027
(22) PCT Filed: Sep. 23, 1999
(86) PCT No.: PCT/FR99/02257
  § 371 Date: May 23, 2000
  § 102(e) Date: May 23, 2000
(87) PCT Pub. No.: WO00/17535
  PCT Pub. Date: Mar. 30, 2000

(30) Foreign Application Priority Data

Sep. 23, 1998 (FR) ............................................. 98 11991
Jul. 30, 1999 (FR) ............................................. 99 09974

(51) Int. Cl.⁷ ............................................. F16D 13/75
(52) U.S. Cl. ................................. 192/70.25; 192/111 A
(58) Field of Search .......................... 192/70.25, 111 A

(56) References Cited

U.S. PATENT DOCUMENTS

| | | | |
|---|---|---|---|
| 4,228,883 A | * 10/1980 | Palmer | 192/111 A |
| 5,706,924 A | 1/1998 | Bacher | |
| 5,816,379 A | * 10/1998 | De Briel et al. | 192/70.25 |
| 5,887,689 A | 3/1999 | Young | |
| 5,937,986 A | * 8/1999 | Schubert | 192/70.25 |
| 5,944,157 A | * 8/1999 | Blard et al. | 192/70.25 X |
| 5,971,125 A | * 10/1999 | Doremus et al. | 192/70.25 |

FOREIGN PATENT DOCUMENTS

| | | |
|---|---|---|
| FR | 2739159 | 9/1995 |
| FR | 2753503 | 9/1996 |

* cited by examiner

*Primary Examiner*—Charles A. Marmor
*Assistant Examiner*—Saúl Rodríguez
(74) *Attorney, Agent, or Firm*—Liniak, Berenato, Longacre & White

(57) ABSTRACT

The invention concerns a clutch mechanism comprising a wear take-up device with a ramp (32) ring (330) coupled in rotation into axial mobility with an intermediate part (310) equipped with a tooting (31) engaged in an endless screw (36) integral with a cover. The invention is applicable to a motor vehicle.

49 Claims, 20 Drawing Sheets

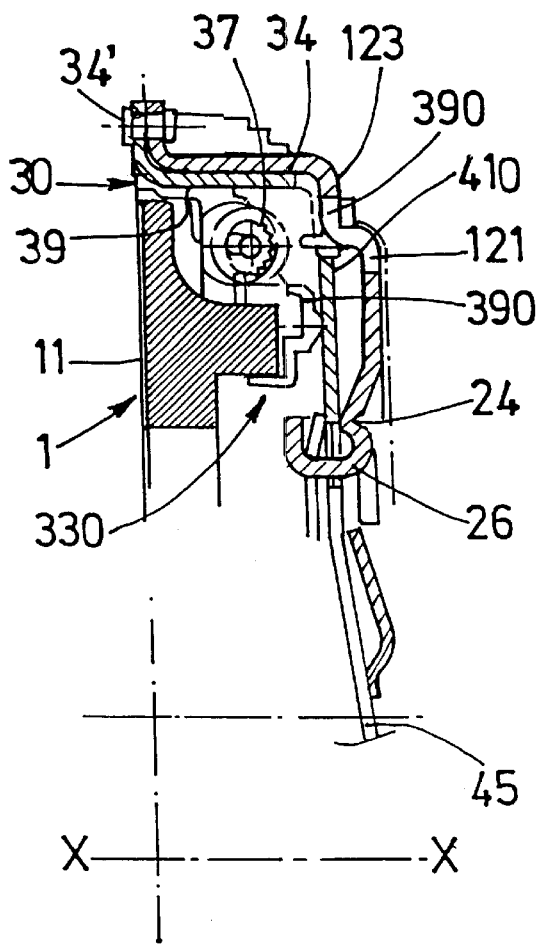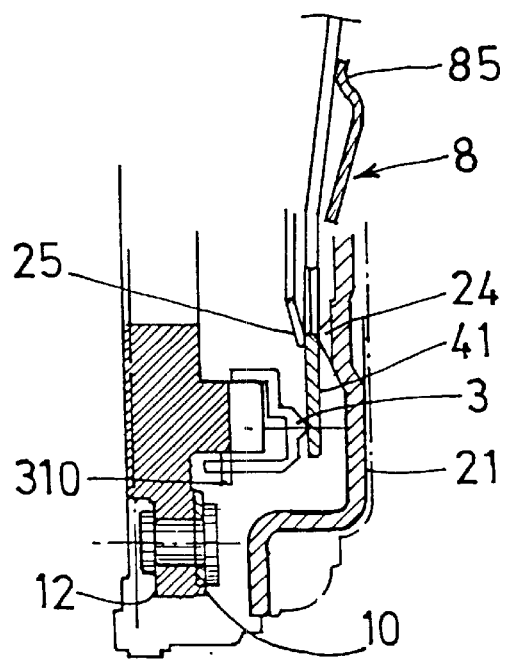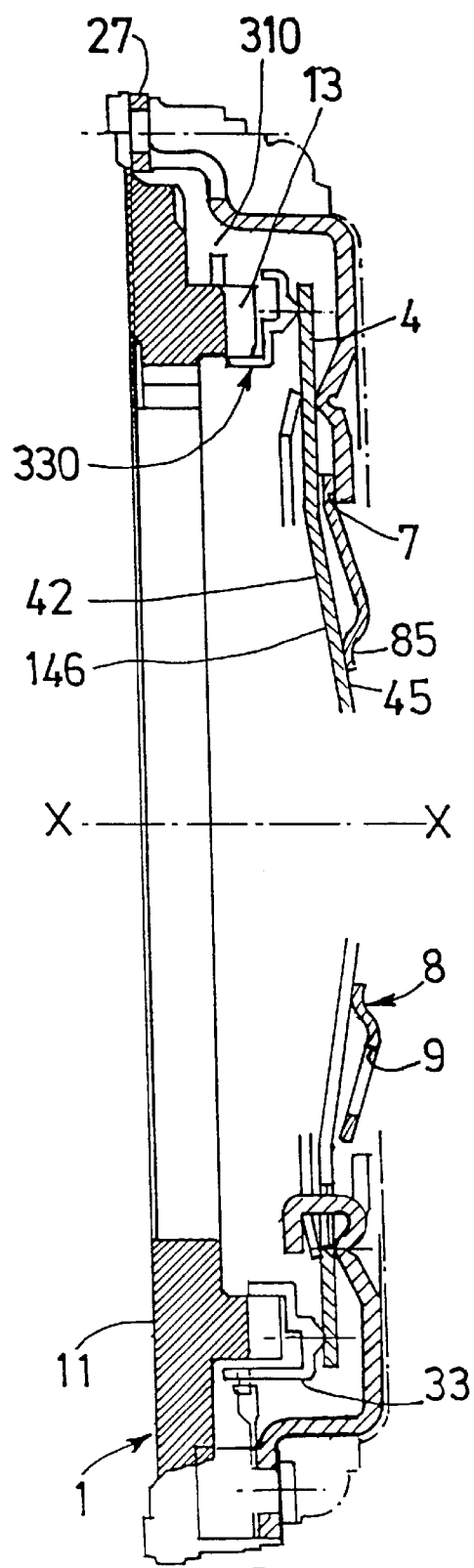
FIG.3   FIG.4

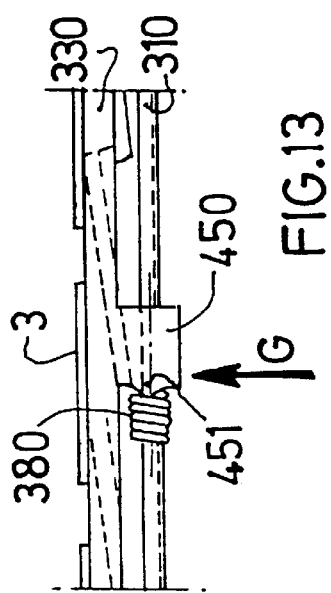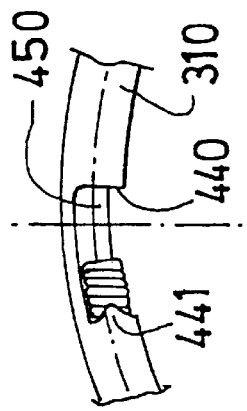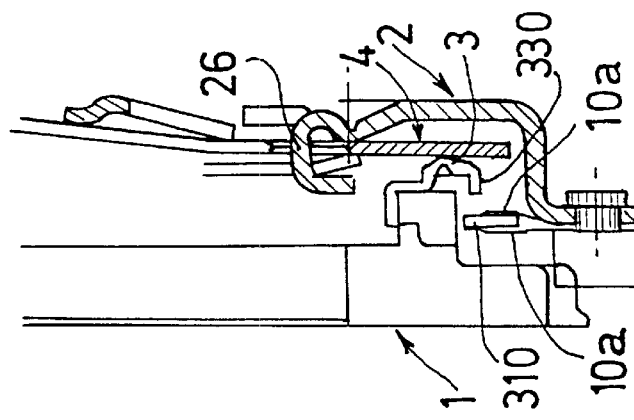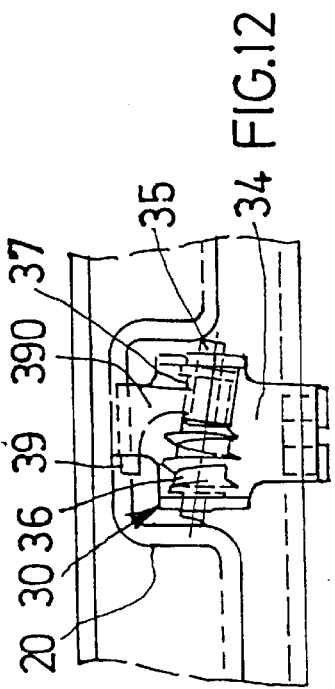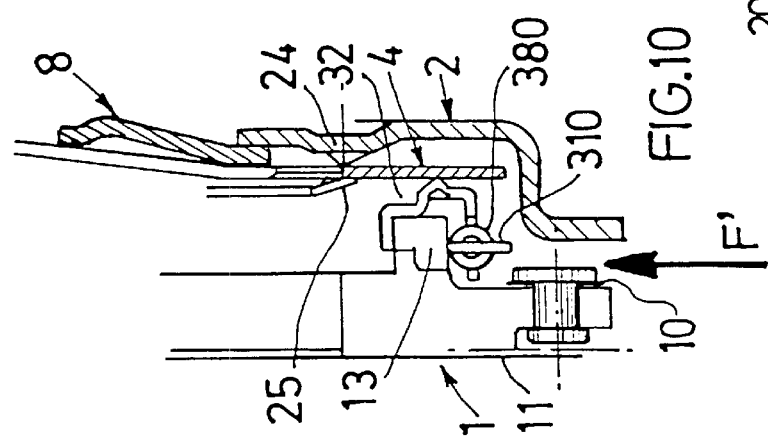

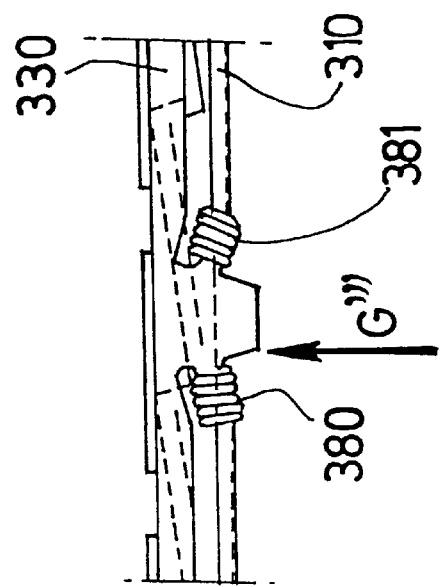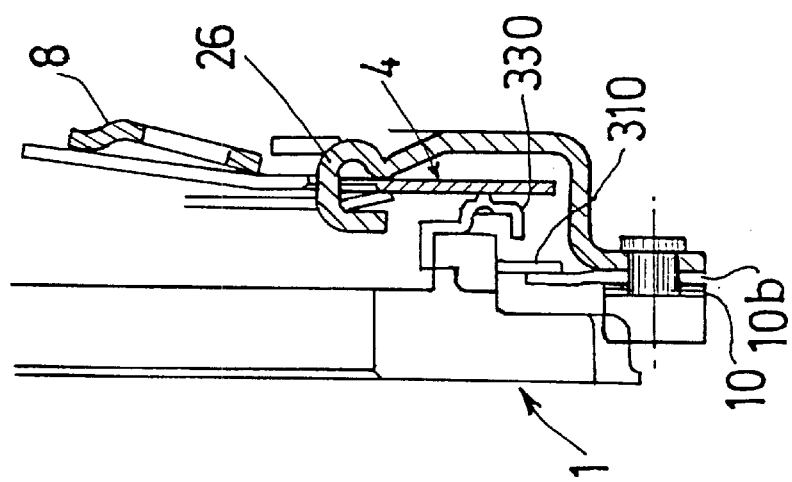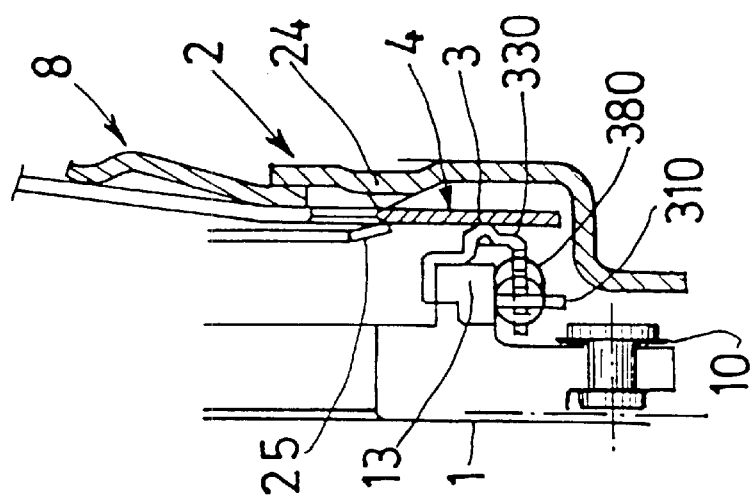

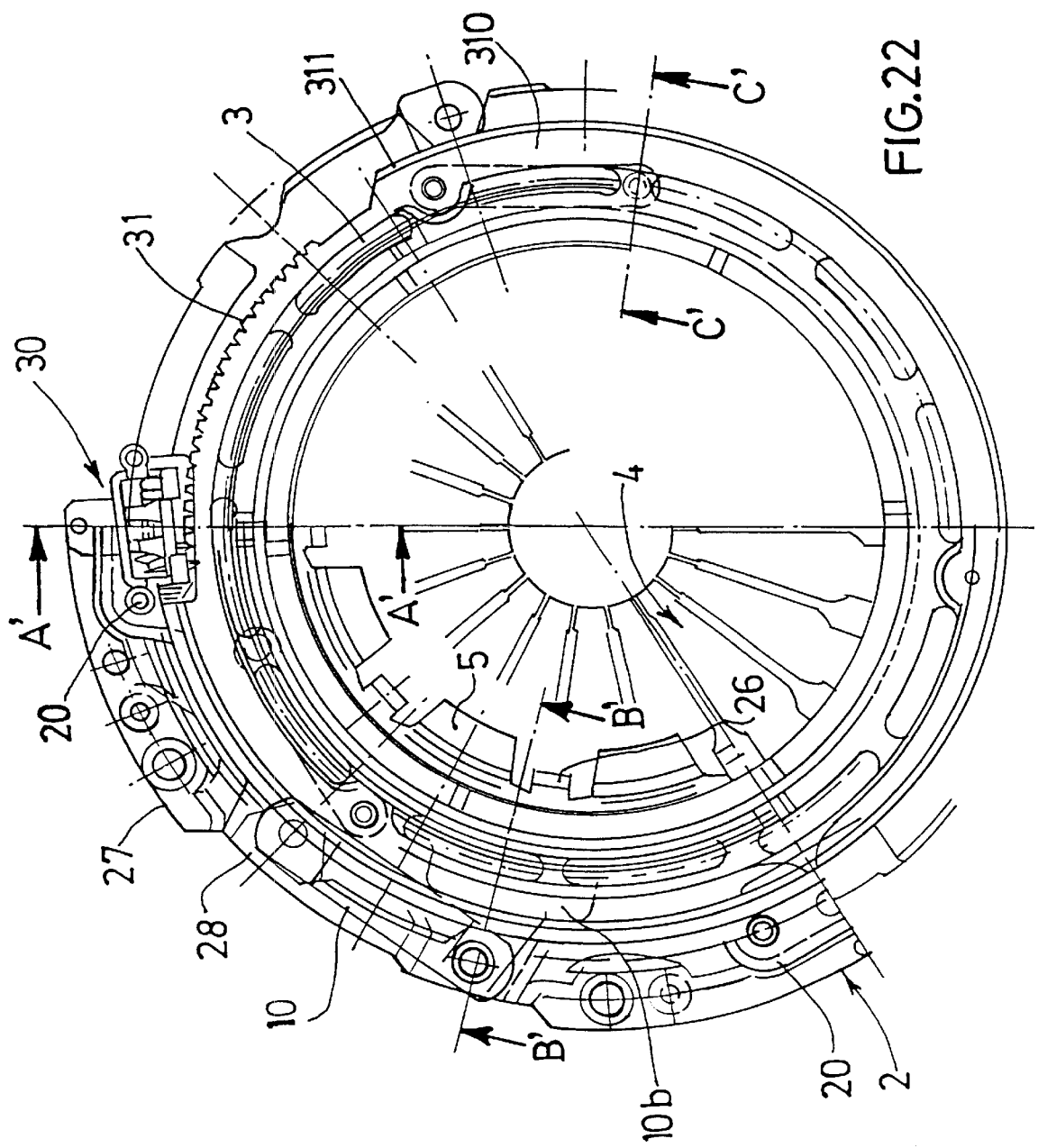

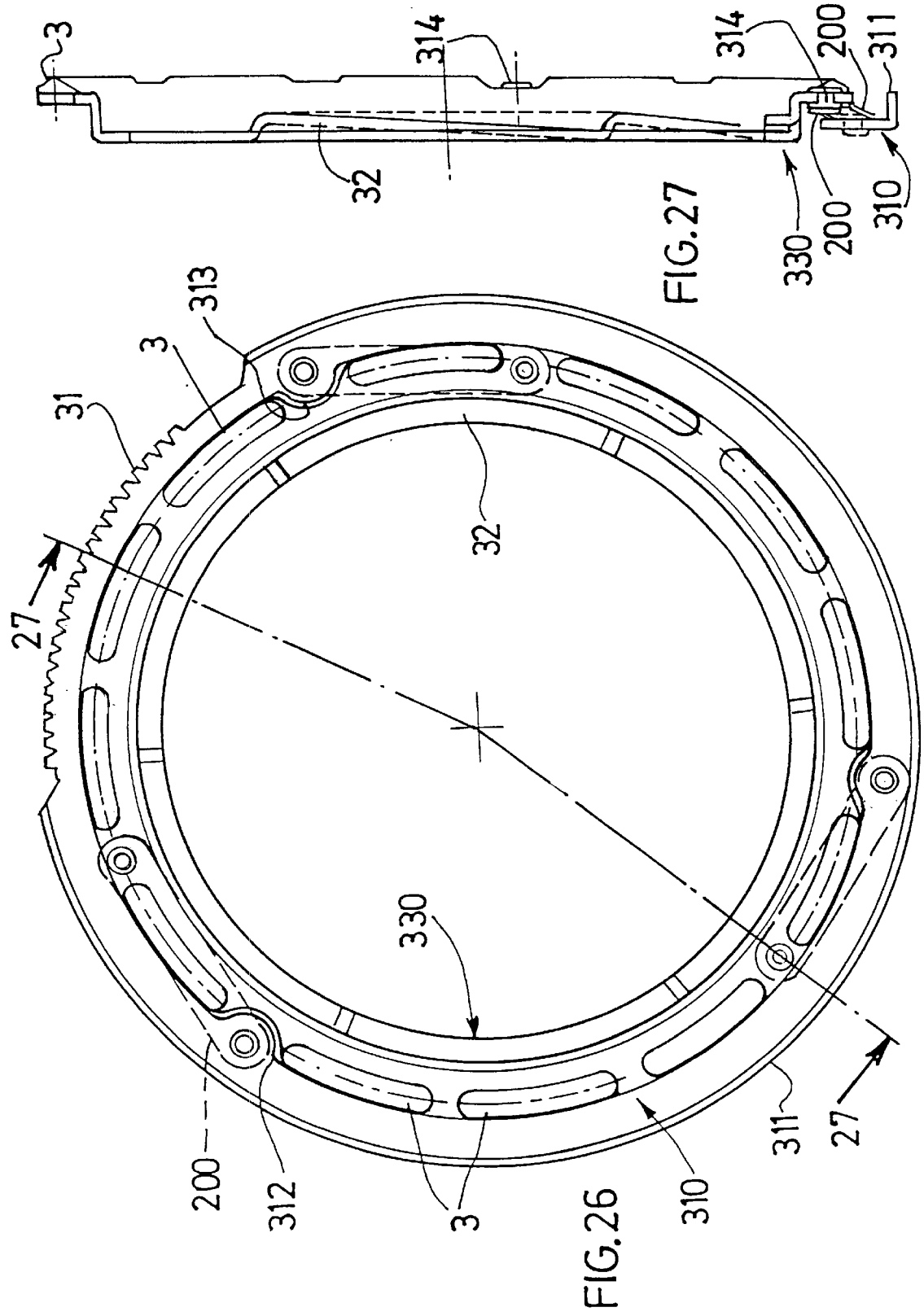

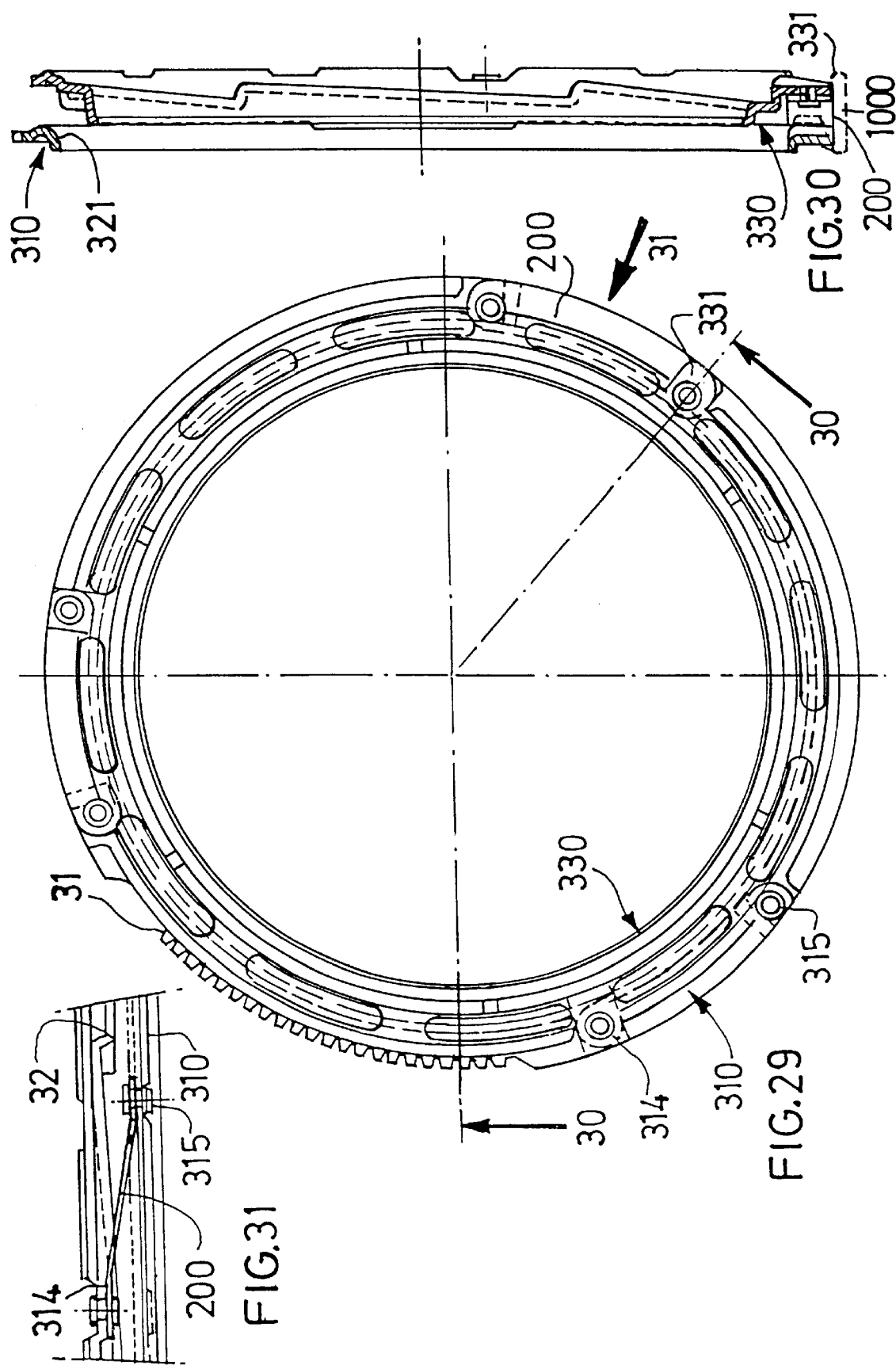

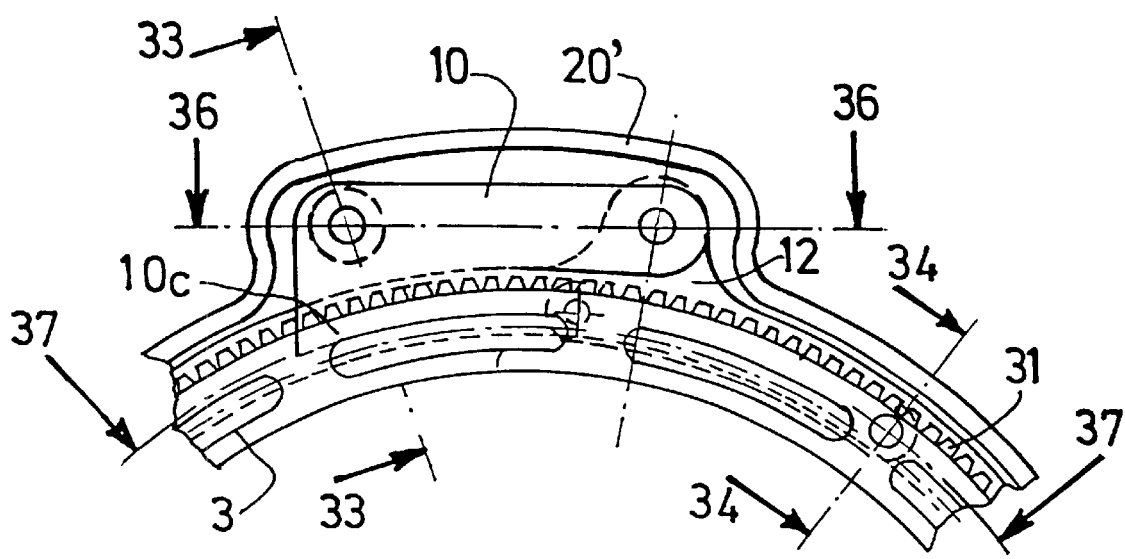
FIG.35
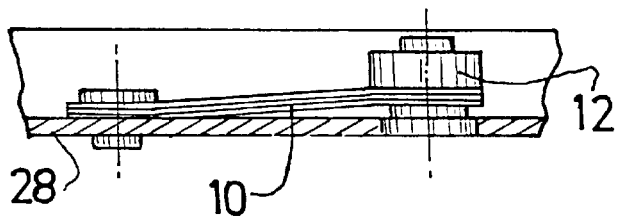
FIG.36
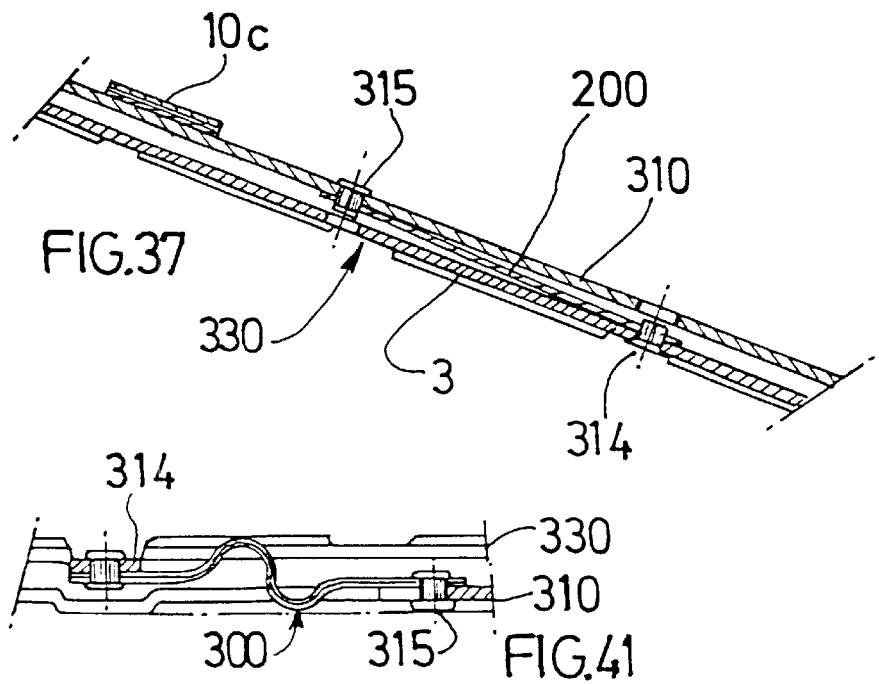
FIG.37
FIG.41

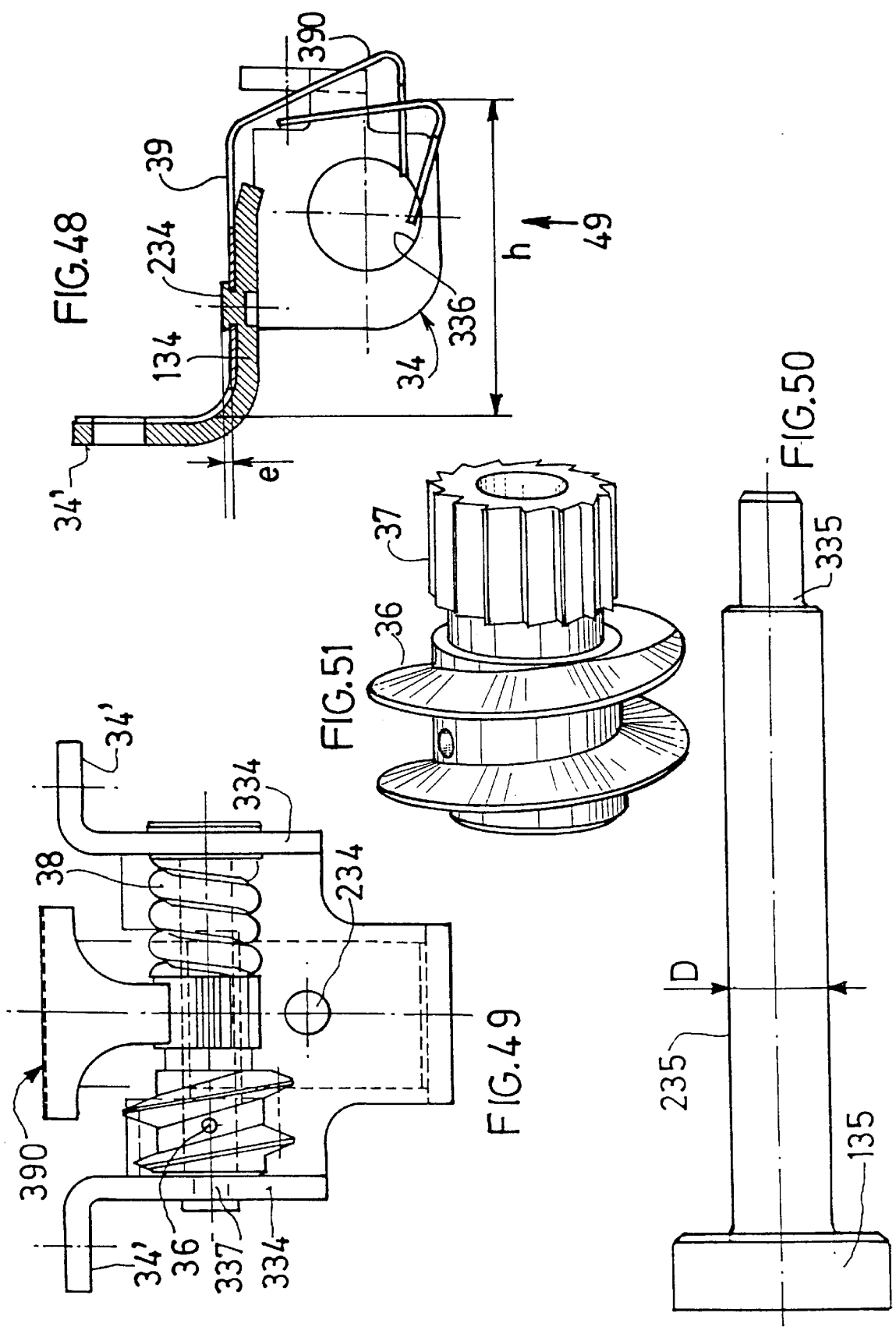

CLUTCH MECHANISM PROVIDED WITH AN ENDLESS SCREW WEAR TAKE-UP DEVICE

BACKGROUND OF THE INVENTION

1. Field of the Invention

The present invention concerns friction clutches, notably for motor vehicles, and relates more particularly to the unitary assembly which such a clutch has, described for example in the documents FRY-A-2 242 892 and FRY-A-2 420 690. Such a unitary assembly is referred to as a clutch mechanism.

2. Description of the Related Art

Conventionally, a friction clutch has a driving flywheel, possibly in two parts in order to form in particular a torsion damming flywheel or a flexible flywheel. The driving flywheel has a reaction plate.

The driving flywheel is fixed with respect to rotation to a first shaft, such as a driving shaft, namely the crankshaft of the internal combustion engine in the context of an application to a motor vehicle.

The reaction plate has a friction face on the back and is fixed with respect to rotation to a pressure plate able to move axially with respect to the reaction plate.

This pressure plate has on the front a friction face opposite that of the reaction plate.

The friction linings of a friction disc are interposed between the pressure and reaction plates, or more precisely between the friction faces thereof, forming friction tracks.

These linings are fixed to a support, usually elastically deformable axially in order to form a progressive friction disc affording assistance during the declutching operation. This support, possibly duplicated, is rigidly or elastically connected to a hub fixed with respect to rotation to a second shaft, such as a driven shaft, namely the input shaft of a movement transmission, for example a gearbox, in the context of an application to a motor vehicle. As a variant, the support is embedded in a friction lining. In all cases, the friction disc has at its external periphery two friction faces which wear during the service life of the clutch.

When the friction lining or linings are clamped between the pressure and reaction plates (clutch engaged), the torque is transmitted from the driving shaft to the driven shaft via the friction disc. When the friction linings are not clamped between the said plates (clutch disengaged), the driven shaft is not driven by the driving shaft. To do this, axially acting engagement means are provided and form an assembly with disengagement means designed to counteract as required the action of the engagement means bearing on a cover for action on the pressure plate, or more precisely for action on support means carried by the pressure plate fixed with respect to rotation to the cover whilst being able to move axially with respect to the latter, for example by means of a connection with axially elastic tongues or by means of a connection of the mortice and tenon type; radial lugs— forming tenons—on the pressure plate being engaged for axial sliding in grooves—forming mortices—in the cover.

This cover has at its external periphery fixing means for fixing it to the reaction plate detachably or non-detachably.

The engagement means include at least one Belleville washer and the disengagement means of the disengagement levers for action on the disengagement means. Usually these engagement and disengagement means belong to the same axially elastic piece referred to as the diaphragm. This diaphragm, frustoconical in shape in the free state, has a peripheral part in the form of a Belleville washer, extended radially towards the centre by a central part divided into radial fingers by blind slots with broadened bottoms to form broadened orifices at the internal periphery of the Belleville washer constituting the axially acting engagement means, whilst the radial fingers form disengagement levers and therefore the clutch disengagement means.

In the documents FRY-A-2 242 892 and FRY-A-2 420 690, the cover constitutes, with the pressure plate, the elastic tongues and the diaphragm, a unitary assembly called a clutch mechanism, which is attached to the reaction plate. Naturally this clutch mechanism can constitute, with the friction disc and reaction plate, a module which is attached in a unitary fashion to the crankshaft of the vehicle engine or to a flange fixed to the crankshaft, the reaction plate then being fixed to the flange, advantageously flexible.

SUMMARY OF THE INVENTION

This mechanism is advantageously equipped with a compensation device, referred to as a wear take-up device, in order to compensate for the wear on the friction lining or linings and the friction faces of the pressure and reaction plates so that the diaphragm has a substantially constant position when the clutch is engaged, and this throughout the service life of the friction clutch. The diaphragm thus exerts a substantially constant load on the pressure plate in the clutch-engaged position. The travel of the clutch release bearing, acting on the internal end of the fingers of the diaphragm, is, in a known manner, substantially constant during the disengagement operation.

This wear take-up device has ramps and counter-ramps acting between the pressure plate and the support means of the diaphragm or between the diaphragm and the cover.

A trigger, sensitive to the state of wear on the friction lining or linings, makes it possible to make the ramps turn in the event of wear so that the diaphragm always occupies the same position when the clutch is engaged under the action of the engagement means (linings clamped).

The trigger has, in one embodiment, a ratchet wheel and a worm system, forming part of a cartridge as described in the document FR-A-2 753 503.

More precisely, an elastic member is provided with a control tongue cooperating with the teeth on the ratchet wheel and a non-return catch.

In the event of wear, the control tongue is maneuvered by an actuator, in this case an appendage of the diaphragm, in order to cause the ratchet wheel to turn and compress a take-up spring allowed subsequently to expand. A non-return catch prevents the worm from turning in the opposite direction, notably when the spring expands. The worm comes into engagement with the set of teeth integral with a ring provided with ramps for cooperating with counter-ramps fixed to the pressure plate.

Thus, in the event of wear, the thickness of the pressure plate, composed of the pressure plate proper and the ring with ramps, is increased, the said ring carrying support protrusions constituting the support means for the engagement means.

The ring therefore comes into engagement directly with the worm.

Such an arrangement gives satisfaction, but nevertheless the applicant has wondered whether it is not possible to eliminate the non-return catch in order to simplify the elastic member.

According to the invention, an engagement mechanism of the above indicated type is characterised in that the set of teeth belong to an intermediate piece connected with respect to rotation to the ring with ramps by means of connecting with respect to rotation allowing an axial movement of the ring with ramps with respect to the intermediate piece.

By virtue of the invention, the non-return catch can be omitted because the set of teeth is solely coupled in rotation to the ring with ramps by the intermediate piece and because the worm can drive the set of teeth in rotation but not vice-versa, the connection being of an irreversible design. Because the set of teeth is not axially connected to the ring with ramps and is therefore not driven by the latter during engagement and disengagement operations, the connection between worm and set of teeth can be reversible. The intermediate piece is axially fixed overall and consists for example of a washer. By virtue of the invention, the presence of a ratchet wheel and control tongue is no longer obligatory. This is because the appendage on the diaphragm can enter a recess in a drum as described in the document FR-A-2 424 442.

In one embodiment, the connection is of the cooperation of shapes type with circumferential mounting clearance and the elastic tongues rotatably connecting the pressure plate to the cover are used for gripping a washer, constituting the intermediate piece, between two tongues in the same set of tongues. To do this, the tongues have protuberances for gripping the intermediate washer. In one embodiment, the protuberances are produced at the end fixing the tongues to the cover. The intermediate washer is thus axially fixed and is provided for example with scallops into which there enter lugs on the ring with ramps thus connected with respect to rotation, with axial mobility, to the intermediate washer by cooperation of shapes.

Naturally, the structures can be reversed, the washer having radial lugs entering into axial scallops in the ring with ramps. As a variant, the intermediate piece is elastically coupled with respect to rotation to the ring with ramps, for example by means of at least one coil spring replacing the take-up spring abutting the worm.

As a variant, the intermediate piece with set of teeth is connected with respect to rotation to the ring with ramps by second axially elastically deformable tongues of the type, referred to as first tongues, acting between the pressure plate and the cover. In this way the friction between the ring with ramps and the intermediate piece is eliminated, the second tongues, in an embodiment with tangential orientation, being coupled at one of their ends to the ring with ramps and at their other end to the intermediate piece carrying the set of teeth.

By virtue of the second tongues, the losses of material can be reduced, the intermediate piece and the ring with ramps being able to be made from the same metallic blank by cropping, the intermediate piece surrounding the ring with ramps.

It should be noted that the second axially elastic tongues in all cases allow the formation of a sub-assembly consisting of intermediate piece and ring with ramps, which can be manipulated and transported. This facilitates the final assembly.

In addition, these second tongues are advantageously mounted with prestressing and exert a return action on the intermediate piece in the direction of at least one stop carried by the cover because of the fact that the ring with ramps is, by means of its support means, in contact with the diaphragm, or more precisely with the external periphery thereof. Thus, because of the prestressing of the second tongues, the sub-assembly consisting of ring with ramps, second tongues and intermediate piece has a thickness in the free state greater than that which it has when it is mounted in the clutch—with clutch engaged between the stop and the diaphragm. The prestressing is advantageously chosen so that the aforementioned sub-assembly is always in contact with the diaphragm and the stop when the clutch is disengaged. The second tongues are arched in order, in a second embodiment, to effect the prestressing. They can have a curved shape. This stop can be formed by means of protuberances belonging to the first tongues. The stop can be divided or continuous. In a variant, the stop is formed by means of rigid pieces serving to grip the first tongues between them and an area of a radial edge which the cover has at its external periphery. Thus the first tongues are protected and they are used to lock the stop or stops with respect to rotation by cooperation of shapes.

By way of variant, the stop is formed by means of balancing masses for the clutch mechanism made necessary by the presence of a cartridge including the worm carried by the cover.

This cartridge is mounted in a housing which the cover has for this purpose. The cover in reality has more than one housing. The empty housings are used for mounting balancing masses serving as a stop for axially locking, in one direction, the intermediate piece which thus has no need to be gripped since it is immobilised axially in the other direction by the ring with ramps in contact with the diaphragm under the return action exerted in the second tongues for connection in rotation with the ring with ramps.

These second tongues can be tongues of the standard type, that is to say of the same type as the first tongues. By virtue of these tongues, the intermediate piece can be centred with respect to a skirt on the cover so that the pressure plate has no need to be machined in order to centre the ring with ramps and so that the ring with ramps is simplified since it is no longer necessary to provide a centring edge on it.

The presence of the intermediate piece makes it possible to locate at least one take-up spring between the intermediate piece and the ring with ramps, which simplifies the cartridge carrying the worm.

The intermediate piece can be not in the form of a continuous ring, particularly when it is connected by tongues to the ring with ramps.

These second tongues can have another shape, for example a concertina shape. The second tongues can also have a circumferential action and thus constitute a take-up spring. To do this, they advantageously have a concertina shape, which makes it possible to eliminate the take-up spring at the level of the cartridge, the tongue being mounted with prestressing between the ring with ramps and the intermediate piece.

As a variant the second tongues, instead of being arched, are flat originally and it is the first tongues, whose return force is then increased, which force the intermediate piece in the direction of the ring with ramps.

Removable hooks or links, for example in the form of clips, act, in one embodiment, between the intermediate piece and the ring with ramps in order to protect the second tongues before mounting the aforementioned sub-assembly thus created on the cover. As a variant the hooks can be replaced with screws, bolts, etc, which are removed finally in the same way as the hooks. In all cases the intermediate piece is pressed against an axial stop carried by the cover and designed to maintain the intermediate piece in the axial direction going from the cover to the pressure plate. In one embodiment the take-up spring is mounted under prestressing so that the take-up takes place principally during re-engagement and the wear and relative movements between the set of teeth and the screw are reduced.

Other advantages will emerge in the light of the description with regard to the accompanying drawings, in which:

BRIEF DESCRIPTION OF THE DRAWINGS

FIG. 3 is a view in section along the line A—A of FIG. 1;

FIG. 4 is a view in section along the line B—B of FIG. 1;

FIGS. 10 and 11 are half-views in section similar to those of FIGS. 3 and 4 for a second embodiment of the invention;

FIG. 12 is a view similar to FIG. 8 for this second embodiment;

FIG. 13 is a partial view in the direction of the arrow F' in FIG. 10;

FIG. 14 is a partial view in the direction of the arrow G in FIG. 13;

FIGS. 19 to 21 are views similar to FIGS. 10, 11 and 13 for a fifth example embodiment of the invention;

FIG. 22 is a view similar to FIG. 1 with local cutaways for a sixth example embodiment of the invention;

FIG. 26 is a front view of the assembly consisting of intermediate piece and adjustment ring with ramps in FIG. 22;

FIG. 27 is a view in section along the line 27—27 in FIG. 26;

FIG. 29 is a view of the assembly consisting of intermediate piece with set of teeth and ring with ramps, and support means for the engagement means, for a seventh example embodiment;

FIG. 30 is a view in section along the line 30—30 in FIG. 29;

FIG. 31 is a view in the direction of the arrow 31 in FIG. 29;

FIGS. 33, 34, 36 are views in section along, respectively, the lines 33—33, 34—34 and 36—36 in FIG. 35 for an eighth example embodiment;

FIG. 35 is a partial view at the level of one of the first tongues for this eighth example embodiment;

FIG. 37 is a view in the direction of the arrow 37 in FIG. 35;

FIG. 38 is a partial front view with local cutaways for a ninth example embodiment;

FIGS. 39 to 41 are views, respectively, along the lines 39—39, 40—40 and the arrow 41 in FIG. 38;

FIG. 48 is a view similar to FIG. 47 for a twelfth example embodiment;

FIG. 49 is a view of the support in FIG. 47;

FIG. 50 is a view of the shaft in FIG. 48;

FIG. 51 is a perspective view of the assembly consisting of worm and ratchet wheel in FIG. 48. In the figures the common elements will be allocated the same reference numbers.

DETAILED DESCRIPTION OF THE PREFERRED EMBODIMENTS

Figure 1:
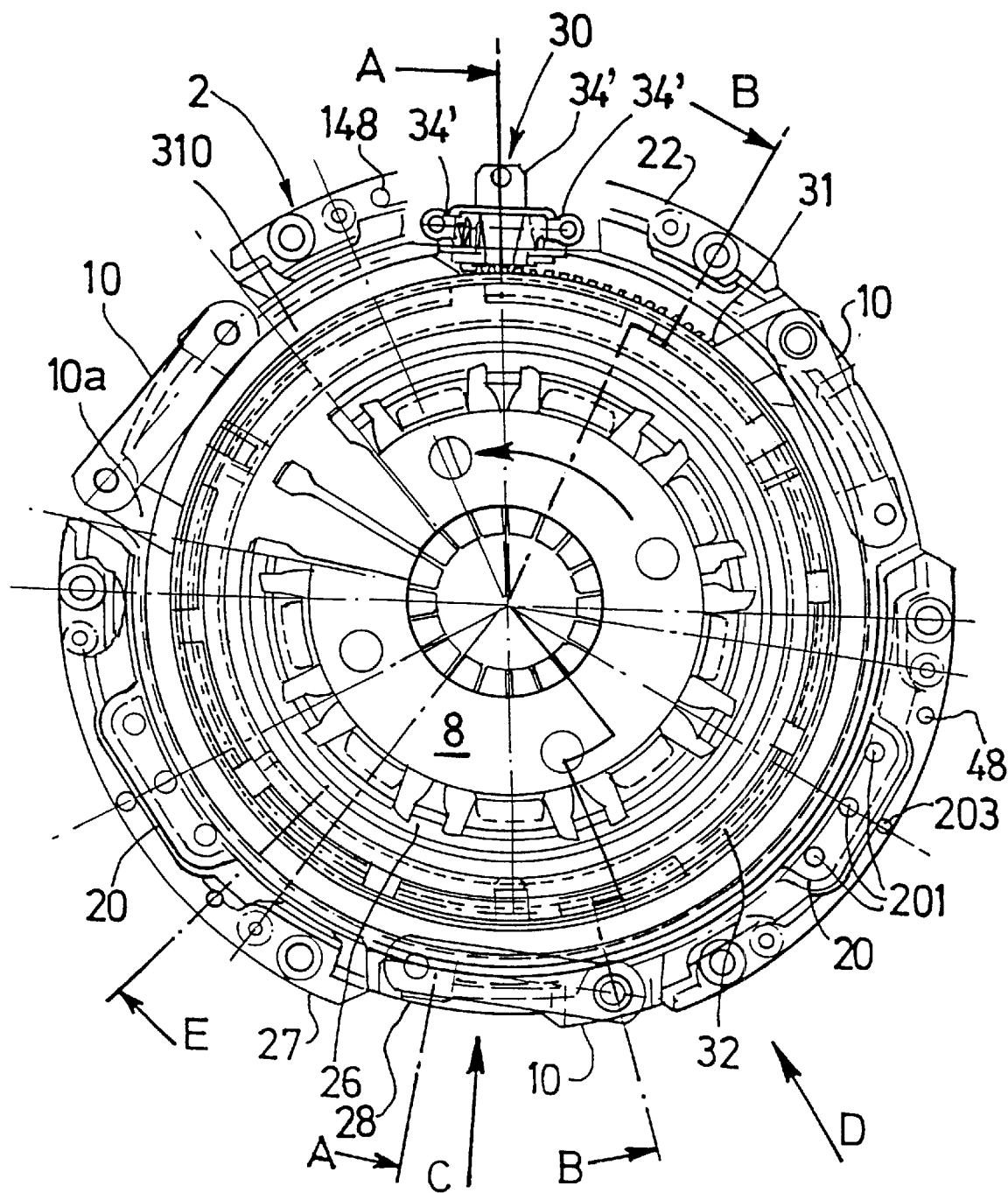
FIG. 1 is a front view of a clutch mechanism according to the invention with local cutaways in order to show the diaphragm, the tangential tongues, the ramp means and the cartridge of the wear take-up device.

These figures depict a clutch mechanism forming a unitary assembly which is usually attached to a reaction plate belonging to a driving flywheel, possibly divided in order to form a damping flywheel or a flexible flywheel, with the insertion of a friction disc between the reaction plate and the pressure plate which the clutch mechanism has.

Where it is a case of an application for a motor vehicle, the driving flywheel is fixed with respect to rotation to the crankshaft of the internal combustion engine, forming a driving shaft, whilst the friction disc has at its external periphery friction linings, fixed for example by riveting or by a connection with no fixing rivets, to a support, possibly duplicated, axially elastically deformable to form a progressive friction disc and coupled rigidly or elastically to a hub fixed with respect to rotation, here to the input shaft of the gearbox, forming a driven shaft. In a variant, the support is embedded at its external periphery in a friction lining. The friction disc has in all cases two friction faces and at least one lining, the support being axially elastic or axially rigid.

It is the friction lining or linings which are therefore intended to be clamped disengagably between the pressure and reaction plates in order to transmit torque from the vehicle engine to the input shaft of the gearbox. To do this, axially acting engagement means are provided for clamping the friction linings between a friction face 11 or friction track, which the pressure plate has on the front, and a friction face or friction track on the back of the reaction plate, which can be carried by a flexible disc fixed to the crankshaft.

The engagement means form an assembly with the disengagement means provided for intentionally counteracting the action of the engagement means which bear on the one hand on a cover 2 and on the other hand on support means 3, carried by the pressure plate 1, or more precisely by the rear face thereof.

The disengagement means have disengagement levers, on the internal ends of which there acts a clutch release bearing which is manually controlled, mechanically or hydraulically, or semi-automatic or automatically. The bearing can therefore be maneuvered by an actuator with an electric motor controlled according to programs predetermined by a computer receiving information notably on the rotation speeds of the driving and driven shafts and on the intention of the driver to change gear. The actuator can be connected hydraulically or manually to the clutch release bearing. Thus the clutch release bearing can form part of a hydraulic receiver of the concentric type through which the gearbox input shaft passes and connected to a hydraulic transmitter and maneuvered by the actuator or manually.

In the figures, the engagement and disengagement means belong to the same part referred to as the diaphragm 4.

This diaphragm is frustoconical in shape in the free state and has a characteristic curve (the force exerted as a function of its deflection) which is sinusoidal in shape. Thus, starting from the origin, the characteristic curve increases to a maximum and then decreases to a minimum in order to increase once again. In the clutch engaged position, the diaphragm occupies a position in the decreasing part of its characteristic curve, close to its maximum.

The same characteristic curve is obtained with a Belleville washer.

For the record, it should be noted that the diaphragm 4 has an external peripheral part in the form of a Belleville washer 41 constituting the engagement means. This peripheral part is extended radially towards the centre by a central part divided into radial fingers 42, by blind slots 43.

The fingers 42 form disengagement levers, whilst the slots 43 open out at their internal periphery into the central opening of the diaphragm 4 and at their external periphery into broadened orifices 44 forming the blind bottoms of the slots 43. These orifices 44 are here rectangular in shape.

In these figures, the clutch mechanism therefore has, in a unitary fashion, a set of annular parts, namely a pressure plate 1, a cover 2 and a diaphragm 4, bearing on the one hand on the cover 2 and on the other hand on the support means 3 for clamping friction linings between the friction faces of the pressure 1 and reaction plates.

The pressure plate 1, made of castable material, here made from cast iron like the reaction plate, is rotatably connected to the cover 2 whilst being able to move axially with respect thereto, here by means of tongues 10, elastically deformable axially. The tongues 10, referred to as first tongues, are here tangentially oriented and are fixed, here by riveting, at one of their ends to the cover and at their other end to the pressure plate 1, or more precisely, each to a lug 12 of the plate 1 projecting radially outwards. As a variant the tongues 10 are radially oriented.

In a variant, the lugs 12, forming tenons, are engaged in axial grooves forming mortices in the cover 2.

The tongues 10 constitute means of returning the pressure plate in the direction of the cover, the diaphragm 4 forcing the pressure plate 1 in the opposite direction to the cover. More precisely, the cover 2 has on the one hand a bottom 21 with a central hole and transversely oriented and on the other hand means 22 of fixing the cover 2 to the reaction plate. The tongues 10 force the pressure plate 1 in the direction of the bottom 21.

In the figures depicted, the cover has roughly the shape of a hollow dish and has a radial end flange 22 directed radially in the opposite direction to the axis of axial symmetry X—X which the clutch mechanism has. This flange 22 is connected, by an axially oriented annular skirt 23, to the bottom 21. The skirt 23 is stepped in diameter and open at the level of the tongues 10, which elastically return the pressure plate in the direction of the bottom of the cover 2.

The flange 22 constitutes the fixing means and is divided into areas 28, 27 offset axially for fixing the tongues 10 and for fixing to the reaction plate. The areas 27 for fixing to the reaction plate have holes for the passage of members for fixing to the reaction plate, here screws. In a variant, the reaction plate can be fixed to a flexible disc secured to the crankshaft. The cover 2 can be fixed by its skirt 23 to the flexible disc. For example, the skirt 23 has at its free end lugs fixed by welding or riveting to the flexible disc. The diaphragm 4 bears at the external periphery of its Belleville washer 41 on the support means 3, whilst the internal periphery of its Belleville washer 4 is mounted so as to tilt between two facing supports, respectively a secondary support 25 carried by the fixing lugs 26 and a primary support 24 carried by the bottom 21.

The fixing lugs 26 originate by cropping and folding from the internal periphery of the bottom 21 of the cover 2, here made from pressed sheet metal.

The lugs 26 are distributed circumferentially in a regular manner and are axially oriented.

The lugs 26 pass axially through the broadened orifices 44 in the diaphragm 4 and have, beyond the diaphragm 4, a free end folded radially outwards, that is to say radially in the opposite direction to the axis of the assembly in order to form a fixing elbow for a spring ring 125, frustoconical in shape, having at its external periphery a rounded edge 25 constituting the secondary support. The primary support 24 has the form of an annular ring here formed by pressing the bottom 24 of the cover 2. This ring 24 is here divided.

As a variant, this ring 24 is attached to the cover 2. The internal periphery of the Belleville washer 41 of the diaphragm is interposed axially between these supports 24, 25 opposite each other. In the clutch engaged position, the diaphragm 4 is in abutment on the primary support 24 and on the support means 3 of the pressure plate.

By acting by pushing on the internal ends of the fingers 42 of the diaphragm 4 by means of a clutch release bearing (not shown), the diaphragm 4 is caused to tilt, which then bears on the secondary support 25, in order to cancel out the load which it exerts on the pressure plate 1 via the support means 3; the tongues 10 return the pressure plate in the direction of the bottom 21 of the cover 2 in order to release the friction linings and disengage the clutch.

Naturally, the secondary support can be discontinuous whilst being formed by the free ends of the fixing lugs 26 shaped accordingly in the aforementioned document FR-A-2 242 892.

The fixing lugs 26 here alternate circumferentially with support lugs 25, transversely oriented.

These stop lugs are made in a single piece with the bottom 21 of the cover by cropping and extend at the internal periphery of the bottom 21 of the cover 2, which thus has internally a serrated shape.

For more information, reference should be made to the document FR-A-2 242 892 showing the fixing lugs 26 before they are folded and the stop lugs 5, which are wider circumferentially than the fixing lugs 26.

The stop lugs 5 here cover a slot 43 separating two consecutive fingers 42.

Naturally, all this depends on the size of the cover. The stop lugs 5 therefore form a stop for at least two fingers 42, forming disengagement levers. These stop lugs 5 here have a trapezoidal shape. The internal diameter of the stop lugs 5 is less than the internal diameter of the fixing lugs 26 after folding. The lugs 5, 26 extend radially below the annular-shaped primary support 24. A scallop 6 separates two consecutive stop lugs 5. A fixing lug 26 is located at the middle of the of the scallop 6 in order to axially enter a broadened orifice 44 in the diaphragm 4.

The internal periphery of the stop lugs 5 extends radially below broadened orifices 44. The fixing lugs 26 constitute fixing means for tilting or pivoting mounting of the diaphragm 4 on the cover. In a variant, the fixing lugs can be omitted and the cover can have only stop lugs as described in the document FR-A-2 420 690. In this case, the fixing lugs have holes for mounting an annular piece in the form of a comb, small columns with a profiled head forming a secondary support, etc. All the embodiments, such as also clamps, small columns carrying two support rings etc, described in this document FR-A-2 420 690, to which reference should be made for more information, can be envisaged. The stop lugs 5, in the form of a tongue, can therefore be fixing lugs. As a variant, the end of the fixing lugs 26 is cut in order to keep only the axial part thereof. The lugs 26 then form centring lugs and the stop lugs 5, fixing lugs in the aforementioned manner. As a variant, the cover does not have stop lugs, some of which form fixing lugs.

As a variant, the fixing lugs 26 can carry a false diaphragm, that is to say a piece whose central part is divided into fingers like that of a diaphragm, whilst the annular peripheral part has no elasticity or has low elasticity. For example, this annular peripheral part, in the form of a washer, is provided with blind radial slots opening out radially at the external periphery of the false diaphragm and of the annular part in the form of a washer.

The washer of the false diaphragm is therefore roughly flat in the free state, as well as the false diaphragm.

A Belleville washer therefore bears at its external periphery on the cover and at its internal periphery on the peripheral washer of the false diaphragm. Such an example embodiment is described in the document DE-A-4 326 501, to which reference should be made for more information.

Naturally, in the light of this document, it can be seen that the false diaphragm can be replaced by a plurality of individual disengagement levers mounted so as to tilt or pivot on the cover by means fixing rings carried by the cover, with the intervention of two Belleville washers mounted in series in order to form engagement means.

In all cases, the cover 2 carries disengagement levers 42 mounted so as to pivot or tilt on the cover 2 and the engagement means can include two Belleville washers mounted in series as in the document DE-A-4 326 501 or a diaphragm mounted in series with an assistance washer as described in the document FR-A-9 711 058 of Sep. 5, 1997 published under the number FR-A-2 753 758, which also discloses a wear take-up device with a ratchet wheel, worm and set of teeth, of the type in the embodiment in FIG. 1 of the present invention.

Numerous clutches provided with a cover with stop lugs, possibly forming fixing lugs, are currently manufactured.

Here this type of cover is used for inserting a shim between the stop lugs and the disengagement levers in order to be able to supply to the car manufacturer or garage operator a new or reconditioned clutch mechanism in a delivery position in which the pressure plate is closer to the bottom 21 of the cover 2 than it is in the storage position when the disengagement levers are in abutment against the stop lugs.

More precisely, a support piece 8 carries at its external periphery fastening lugs 7 projecting radially towards the outside. The support piece 8 is in contact with at least a plurality of disengagement levers 42, whilst the fastening lugs 7 are in contact with the face of the stop lugs 5 turned towards the disengagement levers 42 so that the fastening lugs 7 and the support piece 8 are inserted axially between the disengagement levers 42 and the stop lugs 5 by a mounting of the bayonet type.

In the figures, the support piece 8 has an annular shape and has means 9 for coming into engagement with a tool for turning the support piece.

These means 9 consist here of holes. The ring 8 forming the support piece extends radially below the stop lugs 5 and radially above the internal periphery of the fingers 42 of the diaphragm, close to the said internal periphery.

The ring is here closed whilst being in contact with all the fingers of the diaphragm 4. The ring 8 has a great height so that it constitutes a centrally open circular plate.

Thus the lugs 8 are each introduced initially into a scallop 6 separating two consecutive stop lugs 5. By pressing centrally on the ring 8, the fingers of the diaphragm 4 are moved. Then the ring 8 is caused to turn, by means of a tool entering the holes 9, in order to bring the fastening lugs 7 under the stop lugs 5, and afterwards the load exerted on the ring 8 is released. The fastening lugs 7 are here circumferentially less broad than the trapezoidal-shaped stop lugs 5.

More precisely, the fastening lugs 7 here have a roughly rectangular shape with rounded edges. The circumferential length of the lug 5, longer circumferentially than high, is roughly equal to the circumferential length of the internal periphery of the stop lug 5. The lugs 7 extend radially below the fixing lugs 26. As a variant, the lugs 7 can have another shape, for example trapezoidal, triangular, semicircular or square.

The tool for turning the ring 8 has studs engaged in the holes 9.

Naturally, the ring 8 can be open and thus not come into contact with all the fingers 42 of the diaphragm. It is, in this case, in the form of a circular arch.

The number of fastening lugs 7 depends on the application. Here one fastening lug 7 is provided per stop lug. Naturally, the number of fastening lugs 7 can be less than the number of stop lugs 5.

At least two fastening lugs are provided in diametrically opposed positions.

Naturally, the holes 9 can be replaced by scallops or lugs formed at the internal periphery of the ring 8.

In all the figures, the central part of the bottom 21 of the cover has the same shape and an arrow can be seen indicating the direction of rotation of the ring 8 during its removal.

The ring 8 is here in a single piece with the lugs 7 and is made of pressed sheet metal.

This ring can be provided with a coating with a low coefficient of friction at its portion intended to come into contact with the fingers 22 and at the external face of the lugs 7 turned in the direction opposite to the diaphragm.

The arrangement facilitates the rotation of the support piece 8.

Naturally, the ring 8 can be made from another material, for example a composite material reinforced with fibres or based on aluminium. It can therefore be made of castable material. After mounting of the clutch mechanism on the reaction plate or a flexible disc fixed thereto the shim is removed by means of the aforementioned tool.

By virtue of the shim, the screws for fixing the cover 2 to the reaction plate can be shorter and the tongues are protected before fixing the clutch mechanism to the reaction plate. The support piece 8 with its lugs 7 constitutes a tool for mounting the clutch mechanism on the reaction plate, which is removed after the fixing of the cover to said reaction plate. The converse is possible so that this can constitute a removal tool for taking the friction linings off the pressure plate 1. Here the shim makes it possible to provide, in the delivery position, the parts of a wear take-up device as well as the tongues 10.

More precisely, in FIGS. 1 to 8, the ring 8 with its single-piece lugs allows the mounting, without destruction, of a cartridge 30 belonging to a wear take-up device making it possible, in service, to compensate for the wear due principally to the friction lining or linings of the friction disc. The cartridge 30 is mounted on the cover 2 before fixing the pressure plate 1 to the cover.

More precisely, the diaphragm 4 is first of all fixed to the cover 2 by means of the fixing lugs 26 in the aforementioned manner, the diaphragm 4 being mounted so as to tilt between the two supports 24, 25. Next the ring 8 with its lugs 7 is mounted in the aforementioned manner between the stop lugs 5 and the internal periphery of the fingers 42 of the diaphragm 4. The diaphragm then occupies a plane position corresponding to that which it occupies once the clutch mechanism is mounted on the cover 2.

Figure 7:
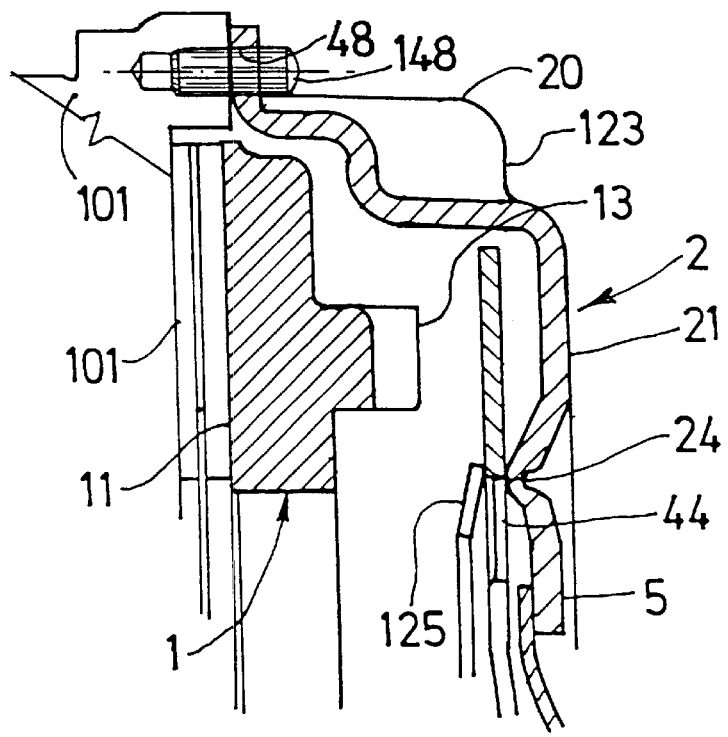
FIG. 7 is a view in section along the line E—E in FIG. 1.

In this position, the clutch is engaged. FIG. 7 depicts schematically at 100 the reaction plate, and at 101 the friction disc, or more precisely the friction linings thereof, makes it possible to reduce the axial bulk of the clutch mechanism, and the wear take-up device holds the diaphragm in this position, which corresponds to the position with clutch engaged new. Afterwards, the cartridge 30 is fixed and a prebalancing operation is carried out.

Then the pressure plate 1, here carrying ramp means 32 and therefore of variable thickness, is brought closer as described below.

Next, the pressure plate 1 is mounted on the cover 2. More precisely, the plate 1 being equipped with tongues 10, the other ends of the tongues 10 are fixed to the cover 2.

Finally, a balancing operation is finally carried out.

Here the cartridge 30 is mounted in a housing 20 formed as a thicker part, here by pressing, in the cover 2, at its fixing flange 22. The housing 20, formed at the external periphery of the cover 2, affects the flange 22 and the skirt 23 of the raised plate and at the level of the housings 20.

The axial bottom of the housing 20 is formed by a transverse area 123 of the skirt 23 at the bottom 21 of the cover. A window 121 is formed in this area 123 parallel to the bottom 21 whilst being offset axially in the direction of the flange 22 with respect to the bottom 21.

The number of tongues 10 depends on the application. Here three sets of tongues 10 placed one above the other are provided as well as three housings 20. The housings 20 and the tongues 10 are distributed circumferentially in a regular manner, and in alternation.

Only one of the housings 20 is provided with a window 121, namely the one serving to house the cartridge 30. Each set of tongues 10 has at least two tongues 10 placed one above the other. Here three tongues 10, elastically deformable axially, are provided per set of tongues 10.

Figure 5:
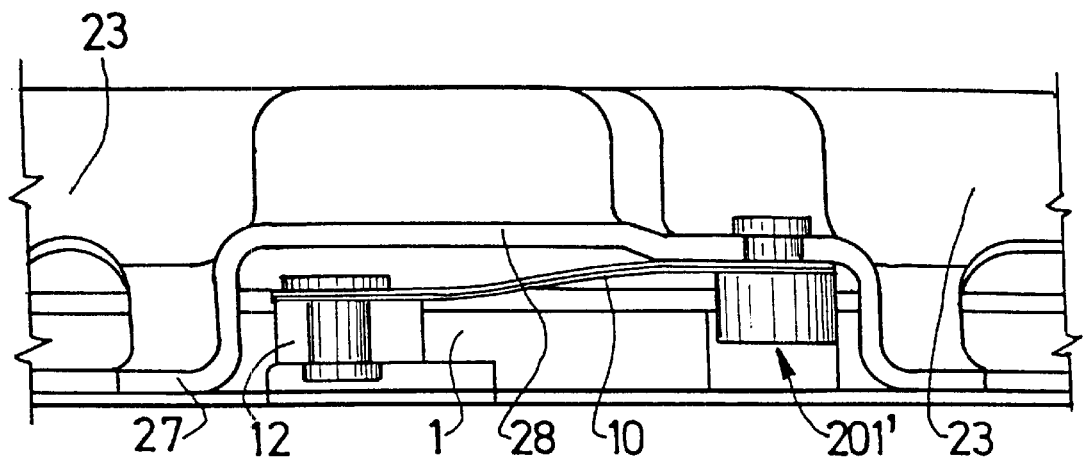
FIGS. 5, 6 are views in the direction of the arrows respectively C and D in FIG. 1.
Figure 6:
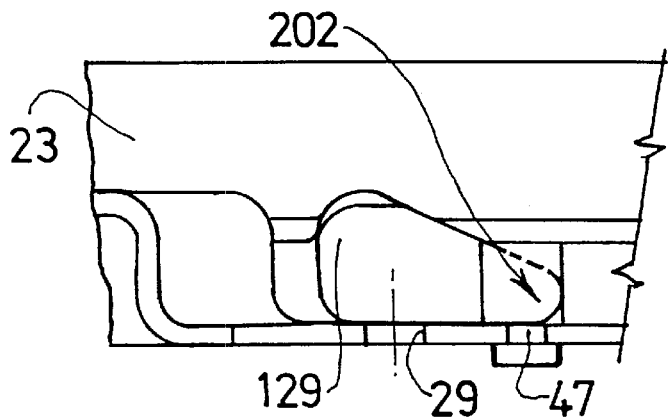

The cartridge 30, described below, creates an imbalance. For this reason, before mounting the pressure plate 1, a prebalancing is carried out by means of prebalancing rivets 201 mounted on the axial bottoms 123, with no holes, of the housings 20. Three rivets 201 are provided per housing 20, not allocated to the housing in the cassette. Another prebalancing rivet 201' is provided diametrically opposite to the cartridge 30. This rivet 201' serves to fix a set of tongues 10 to the cover 10, as can be seen in FIG. 5. The pressure plate 1 is notched locally at the level of the rivet 201'. All this is because the pressure plate is notched at the level of the cartridge 30 in order to create a step.

Finally, balancing rivets 202 are placed at the required points in order to balance the clutch mechanism.

The flange 22 has for this purpose, in advance, balancing holes 47 for mounting the balancing rivet or rivets 202. To do this, numerous holes 47 must be provided for placing the rivets 202.

The flange 22 also has on the one hand fixing holes 29 for the passage of members—such as screws or rivets—for fixing the flange 22 to the reaction plate, and on the other hand centring holes 48 for the passage of centring studs 148 (FIG. 7) carried by the cover.

Openings 129 are produced in the skirt 23, at the level of the fixing holes 29 for the passage here of the heads of the screws for fixing the cover 2 to the reaction plate.

The openings 129 have a non-symmetrical shape. More precisely, they can be seen in dotted lines in FIG. 1, the size of a head of a fixing screw and of a balancing rivet 202. The fixing 29 and balancing 47 holes are adjacent to each other. One pair of holes 29, 47 is provided per opening 129, thus making it possible to increase the support surface of the flange 22 at this level for the heads of the fixing screws. The opening 129 is therefore elongated circumferentially and is deeper at the level of the hole 29; each of the holes 29, 47 being located at the circumferential end of an opening 129.

Each balancing rivet 202 is fixed, like the fixing screws, at the level of a broadened area 122 of the flange 22, formed by means of the opening 129.

The rivet 202 does not project beyond the area 122, whilst the heads of fixing screws project with respect to the areas 122. Additional openings 203 are provided in the flange 22 above the housings 20.

The flange 22 thus has three fixing areas 27 for contact with the reaction plate 100, here slightly hollow in shape as can be seen in FIG. 7. These areas 27 (FIG. 5) alternate circumferentially with the areas 28, offset axially with respect to the areas 27 in the direction of the bottom 21 of the cover 2 for fixing, here by riveting, the tongues 10 to the cover. The skirt 23 is therefore open at this level, which allows the passage of fixing lugs 12, which the pressure plate 1 has, projecting radially at its external periphery. The areas 27 serving for fixing the cover 2 are longer than the fixing areas 28 of the tongues connected continuously to the areas 27, in order to form a canopy (FIG. 5).

The areas 27 are affected centrally by housings 20 whilst being less broad at this point. Each end of an area 27 is allocated a broadened zone 122 and an opening 129.

The holes 29, 47 are therefore disposed, as well as the zones 122, on each side of a housing 20 at the ends of a zone 122.

This makes it possible to balance the clutch mechanism well. This is all the more so since, FIG. 3, the pressure plate is notched in order to create a recess for the cartridge 30. This cartridge 30 has a U-shaped support 34 with a central web extending in contact with the deformation in the skirt 23 forming the top of the housing 20 and two lateral wings, which have holes for the passage of a shaft 35 fixed to a worm 36, single-piece with a ratchet wheel 37 interposed between the two wings of the support 34. The screw 36 is adjacent to one of the wings, whilst a helical take-up spring 38 is interposed between the ratchet wheel and the other wing.

The shaft 35 is attached to the inside of the screw 36 and the wheel 37, for example by force fitting.

Figure 8:
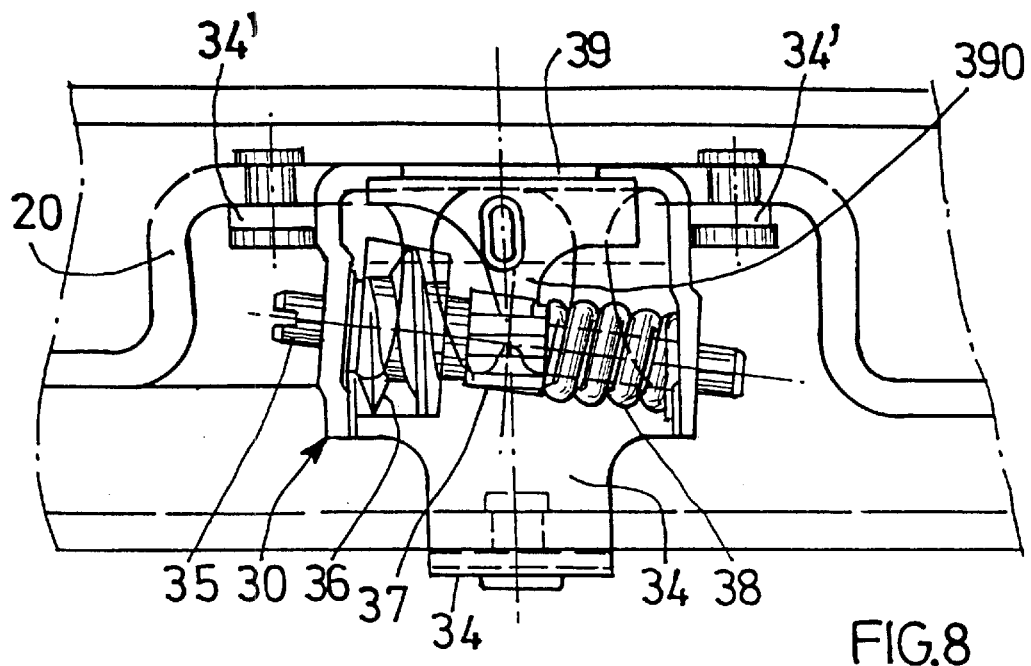
FIG. 8 is a view in the direction of the arrow F of the line 1.

An elastic member 39 is mounted in contact with the internal face of the support web and the screw 36 and between the other wing of the support and the spring 38 (FIG. 8).

The elastic member 39, less thick than the support 34 and metallic, has an oblique flange extended by a return carrying a control tongue 390 cooperating with the teeth on the ratchet wheel 37, and with an actuator 410 formed by an external appendage of the Belleville washer 41 of the diaphragm. The return carrying the control tongue has a non-symmetrical shape since the shaft 35 is inclined.

The support 34 has three fixing lugs 34', for fixing it by riveting respectively to the flange 22 and to the zone 123 and therefore to the cover.

The worm 36 is disposed tangentially with respect to a set of teeth 31 extending radially outwards in the opposite direction to the axis X—X of axial symmetry of the clutch mechanism and of the clutch. The set of teeth 31 belongs, according to the invention, to an intermediate piece 310, here in the form of a washer.

Figure 9:
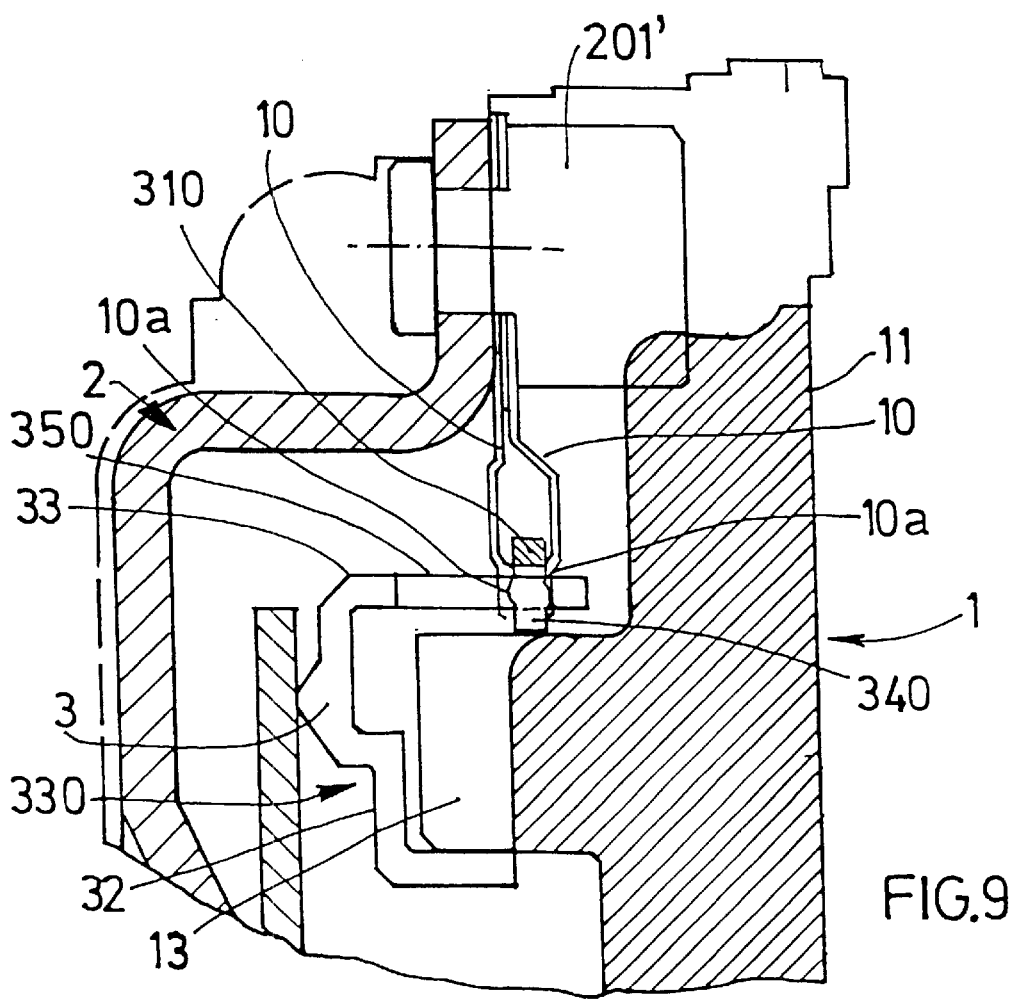
FIG. 9 is a view to a larger scale of the bottom part of FIG. 3 in order to show a set of tongues.

The intermediate piece is here axially fixed overall. More precisely, each set of first tongues 10 has at least two tongues each provided with a protuberance 10a directed roughly radially outwards. These protuberances 10a have an end roughly in the shape of an annular sector. The washer 310 is gripped axially between two protuberances 10a, as can be seen more clearly in FIG. 9, so that it is axially fixed overall since the protuberances 10a deform slightly axially because of their low radial height.

The protuberances 10a are located at the end by which the axially elastic tongues 10 are fixed to the cover.

Here the tongues 10 are not identical at the level of their fixing to the cover. The intermediate tongue of each set of first tongues 10 has no protuberance and consists of a conventional tongue. The other two end tongues each have a protuberance 10a deformed locally in order to come into abutment on the relevant lateral face of the intermediate washer 310, thus interposed with predetermined clamping between the two protuberances 10a, one of which is dished more deeply than the other. The washer 310 is metallic.

The washer 310 is connected, directly or indirectly, with respect to rotation according to the invention to a ring 330, here metallic. In this embodiment the ring 330 is made of pressed sheet metal and has an axially oriented annular flange 33, which here is connected with respect to rotation by a connection 340, 350 with cooperation of shapes with the intermediate washer 310. This connection 340, 350 allows an axial movement of the ring 330 with respect to the washer 310 coming into engagement through its set of teeth 31 with the worm 36.

Figure 2:
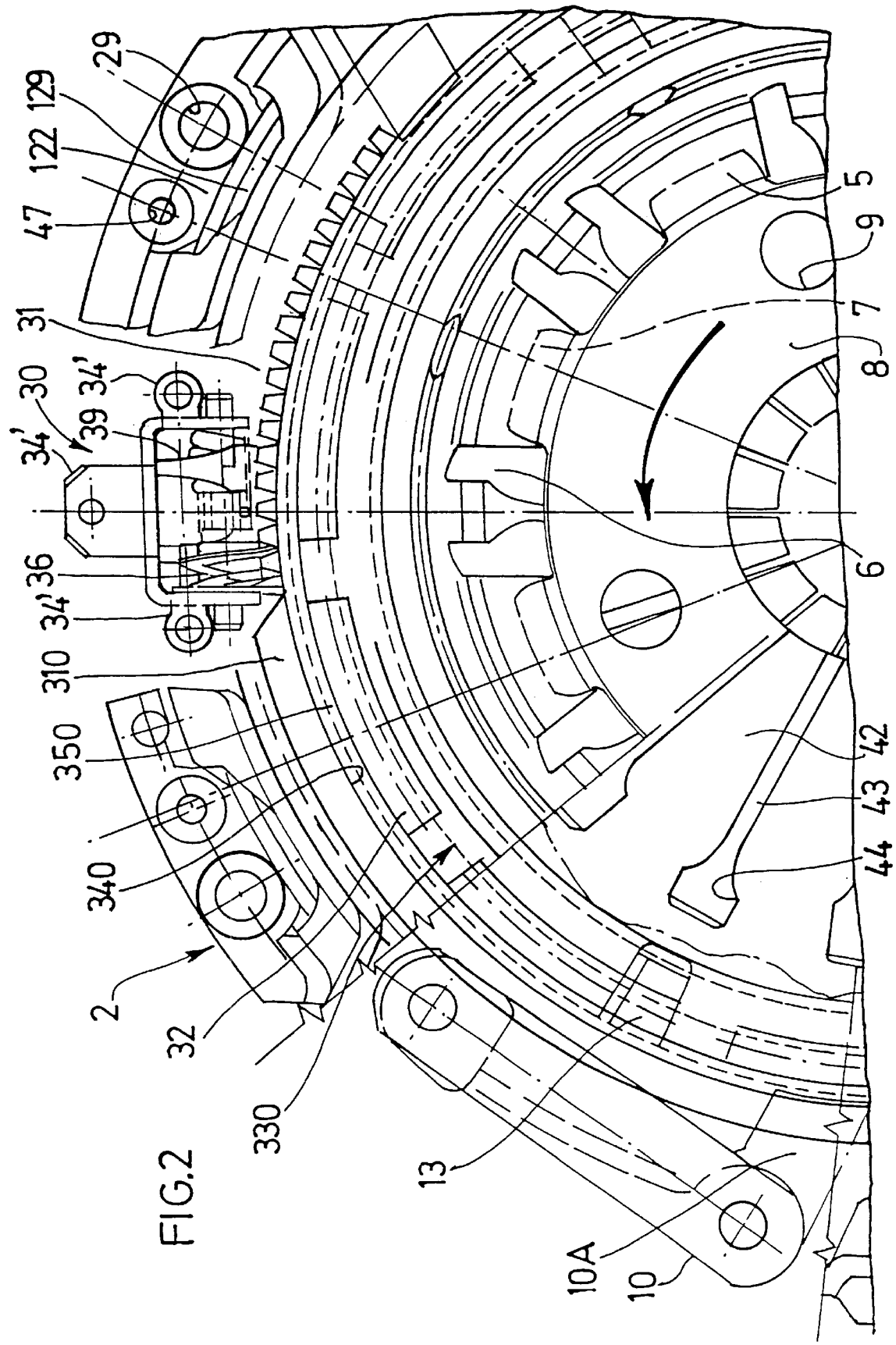
FIG. 2 is a view to a larger scale of part of the top portion of FIG. 1.

The connection by cooperation of shapes is of the mortice and tenon type. The washer 310 here has at its internal periphery three mortices in the form of radially oriented notches 340 open radially towards the inside. The set of teeth 31 is formed at the external periphery of the washer 310 by means of a hollow therein (FIG. 2).

The ring 330 has a flange 33 in the form of a comb with three axially oriented lugs 350 passing through the notches 340, with circumferential mounting clearance.

The intermediate washer 310 therefore meshes here rigidly with the ring 330. Other types of meshing means can be provided.

For example, the washer can have at its internal periphery a set of teeth meshing with a set of teeth provided at the external periphery of the flange 33. Each set of teeth can consist for example of flutes.

The ring 330 has overall in cross-section a U-shape whose external wing consists of the flange 33 with lugs 350 and whose internal wing is intended to be centred by the internal periphery of the studs 13 projecting axially and cast in one piece with the pressure plate. The wings of the ring 330 are axially oriented, the transverse bottom of the ring carrying the support means 3 and ramps.

More precisely, the ring is in intimate contact through its internal periphery with the external periphery of a thicker part divided into studs 13, which the pressure plate has on its back projecting axially. The flange 33 is connected to a divided annular protrusion. This protrusion constitutes the support means 3 for the external periphery of the Belleville washer 41 of the diaphragm.

Radially, below the protrusion 3, ramps 32 are provided for cooperating with the transverse end face, advantageously bevelled, of the studs 13 forming counter-ramps. Thus, in the event of wear, the diaphragm acts through its external actuator 410 on the control tongue 390 in order to cause the ratchet wheel to turn during the re-engagement operation in order to prime the spring 38, the connection 340, 350 preventing a rotation in the reverse direction of the wheel 37 and therefore of the screw 36, which can drive the set of teeth 31 but not conversely. When the spring 38 is sufficiently primed, the screw 36 can rotate the set of teeth 31 in order to cause the ramps 32 in contact with the studs 13 to turn, so as to increase the thickness of the pressure plate in order to compensate for the wear on the linings and the friction disc so that the diaphragm occupies the same position.

For more information, reference e should be made to the application FR-A-2 753 503 of Sep. 17, 1995. Nevertheless, it should be noted that, during engagement and disengagement operations, the ring 330 can move axially, with the pressure plate, with respect to the washer 310 able to move in rotation under the action of the screw 36. No friction occurs between the screw 36 and the set of teeth 31 during these axial movements of the ring 330 since the washer 310 is overall axially fixed, here with respect to the cover by virtue of the protuberances. Thus this does not interfere with the wear take-up operation. The presence of a non-return catch is no longer necessary.

The shim 7, 8 therefore prevents damage to the cartridge 30, or more precisely its elastic member 39 and its control tongue.

It should be noted that the fingers 42 have an internal end 45, offset axially with respect to the zone 46 in which the fingers 42 are rooted in the Belleville washer 41. This zone 46 is in the plane of the washer 41 and includes the orifices 44. It is connected by an oblique portion 146 to the internal end 45 offset axially in the e opposite direction to the bottom 21 of the cover.

The ring 8 h as at its internal periphery a rim 85 directed axially in the opposite direction to the bottom 21 of the cover 2 for local contact with the internal end 45. The lugs 7 are in the plane of the ring 8.

Thus the lugs 7 bear against the internal face, directed towards the fingers 42, of t he stop lugs 5 and the rim 85 is in contact with the external face of the internal end 45 of the diaphragm.

The shim 7, 8 therefore does not project axially with respect to the bottom 21 of the cover and the pressure plate is set back, so that the clutch mechanism is axially compact.

After fixing the cover 2 by screwing to the reaction plate 10, the internal periphery of the ring 8 is pressed on, as for disengaging, and the ring is turned in the direction of the arrow in FIG. 1 in order to remove the shim 7, 8.

The pressure plate 1 therefore carries the hollow ring 330, (32, 33, 3)—forming ramp means—and is of variable thickness between its friction face 11 and the support means 3 in order to compensate for the wear on the friction linings.

In all cases, the fixing lugs 7 are offset axially with respect to the internal periphery of the support piece 8, formed by the flange 81 or the rim 85.

Naturally, the ring 8 can be equipped with gripping means for rotating it by means of a tool in order to bring the fixing lugs below the stop lugs.

The ring 8 can, like a control button, be provided with a bar projecting in the opposite direction to the diaphragm. The means 9 can therefore consist of projections. In general terms, the circumferential length of a fixing lug 7 is less than the circumferential length between two consecutive stop lugs 5 so that the lugs 7 can be introduced into the scallops 6 so as to effect a bayonet mounting.

Openings can be provided between two consecutive fingers 42 forming disengagement levers for the passage of one or more tools affording access to screws for fixing the reaction plate to the crankshaft of the motor vehicle. In this case, the holes 9 in FIGS. 1 to 8 are opposite the said openings for removal of the reaction plate fixed directly or indirectly, for example by means of a plate or mass, to the crankshaft.

As mentioned above, the engagement means can have one or more Belleville washers mounted in series, the disengagement means can be distinct from the disengagement means.

The first tongues 10 can be radially oriented.

In all cases, the first tongues constitute means for rotatably connecting the pressure plate to the cover whilst allowing an axial movement of the pressure plate with respect to the cover.

The stop lugs, directed radially inwards, that is to say towards the axis X—X, can also be fixing lugs; the fastening lugs 7 then passing below the fixing means carried by the stop lugs during bayonet mounting.

The axial offset of the fastening lugs with respect to the internal periphery of the support piece facilitates bayonet mounting and creates a clearance between the fastening lugs and the disengagement levers. In addition, this prevents a deformation of the spring ring 125, or in general terms of the secondary support 25.

The disengagement levers 42 are, in all cases, in contact with the engagement means in direct abutment with the support means 3 or in indirect abutment on the support means 3 by means of the disengagement levers. The disengagement means act as required on the engagement means in order to counteract the action thereof.

As a variant, the engagement means can consist of a plurality of coil springs bearing on a false diaphragm and on the cover.

Naturally, the fastening lugs 7 can be attached fixedly to the support piece, for example by riveting, welding, etc.

As a variant, the rotational connection between the intermediate piece and the ring 330 is effected by tangential tongues, referred to as second tongues, coupled at one of their ends to the ring 330 and at their other end to the intermediate piece.

The second tongues allow an axial movement of the ring with respect to the intermediate piece, advantageously in the form of a washer. The friction between the ring 330 and the intermediate piece is thus eliminated.

Naturally, the intermediate piece can be made axially fixed by protuberances distinct from the tongues 10. This piece is axially fixed with respect to the cover whilst being arranged inside it.

This piece is centred by the pressure plate.

In all cases, a strong gripping of the driving piece is prevented so that the latter can turn. It should be noted that the pressure plate centres the intermediate piece.

The scallops in the intermediate piece can be closed.

The set of teeth 31 can be formed directly at the external periphery of the intermediate piece, in the figures the set of teeth being formed in the bottom of a trapezoidal-shaped scallop produced at the external periphery of the intermediate piece.

In all the figures, the cover 2 and therefore the clutch mechanism is fixed by means of its fixing flange 22 or its skirt 23 to a driving flywheel fixed to the crankshaft of the vehicle engine, the said flywheel having a reaction plate and possibly being divided to form a torsion-damping flywheel—also referred to as a double-damping flywheel—or a flexible flywheel.

By virtue of the invention, the take-up spring 38 may not belong to the cartridge 30 and the intermediate piece can be elastically connected in rotation with the ring with ramps. This is because the take-up spring can be made to act between the intermediate piece 310 and the ring 330 with ramps 32 constituting an adjustment ring so that the engagement means 4 always occupy the same position when the clutch is engaged or clutched.

Thus, in the embodiment of FIGS. 10 to 14, a take-up spring can be seen at 380, of the coil spring type, bearing at one of the circumferential ends on a lateral edge 441 of a scallop in the form of a notch 440, forming a mortice, provided at the internal periphery of the intermediate piece 310 in the form of a flat washer as in FIGS. 1 to 10. The other end of the take-up spring 380 bears on the lateral edge 451 of an axially oriented lug 450 issuing in a single piece from the ring 330 with ramps 32, constituting an adjustment ring with ramps 32 and support means 3 as in FIGS. 1 to 9. The spring 380 acts on the other lateral edge of the lug 450 in abutment on the other lateral edge of the notch 440.

The edges 451, 441 have an apex in the form of a triangle. The edge 451 extends opposite the edge 441 so that the take-up spring 380 is firmly held, the apexes of the edges 451, 441 entering the spring 380 in order to hold it firmly. The apexes of the edges 441, 451 extend in perpendicular planes. The other lateral edges of respectively the lug 450 and notch 440 are straight so that the straight lateral edge of the lug 450 comes into contact with the straight lateral edge of the notch 440 under the action of the spring 380.

Naturally, according to one characteristic, the circumferential width of the axially oriented lug 450, forming a tenon, is less than the circumferential width of the radially oriented notch 440 inside which are mounted on the spring 380 and the lug 450.

The height of the lug 450 is less than the height of the notch 440, as in the embodiment in FIGS. 1 to 9.

Naturally, the number of lugs 450, springs 380 and notches 440 depends on the application. By virtue of this arrangement the cartridge 30, mounted in the housing 20, is simplified since the ratchet wheel is adjacent to one of the wings of the support 34 having a high stop (not referenced) for limiting the movement of the control tongue 390 cooperating with the teeth on the ratchet wheel 37. The circumferential bulk of the cartridge 30 is therefore reduced so that the housing 20 is of smaller size. The clutch mechanism is therefore easier to balance, the spring or springs 380, lug or lugs 450 and notch or notches 440 being distributed in a regular manner.

The control tongue 390 is also simplified since the non-return catch is eliminated. It should be noted that in FIG. 12 the shaft 35, the worm 36 and the ratchet wheel 37 are single-piece. As described in the document FR 98/01453 filed on Feb. 5, 1998 and published under the number FR-A-2 774 441, it can be seen that the cartridge 30 is inclined by means of bearings (not referenced) each having an inclined central hole, the wings on the support 34 being straight. This support is fixed solely by two rivets to the cover. The mounting of the assembly 35, 36, 37 with its bearings is effected by opening the passage holes produced in the wings of the support 34 and by closing the said holes partially, after mounting of the aforementioned assembly, by crimping in contact with the bearings, as can be seen in FIG. 31 of the aforementioned document FR 98/01453, to which reference should be made for more information.

In operation—clutch mechanism mounted on the driving flywheel—the friction lining or linings wear so that the diaphragm acts on the elastic member 39 in order to cause the ratchet wheel, the worm and the intermediate piece 310 to turn in order to prime the take-up spring or springs 380 which, during one or more operations of engagement or disengagement (declutching) of the clutch cause the ring 380 to turn by acting on the lugs 450. Naturally this occurs when the spring or springs 380 are sufficiently primed to overcome the phenomenon of friction and when the load exerted by the diaphragm on the ring has decreased sufficiently.

Friction occurs between the straight edges of the lug 450 and of the notch 440.

Figure 15:
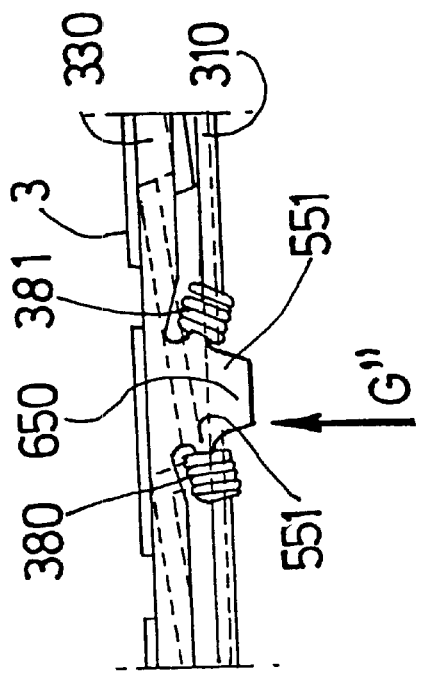
FIGS. 15 and 16 are views similar to FIGS. 13 and 14 for a third embodiment according to the invention.
Figure 16:
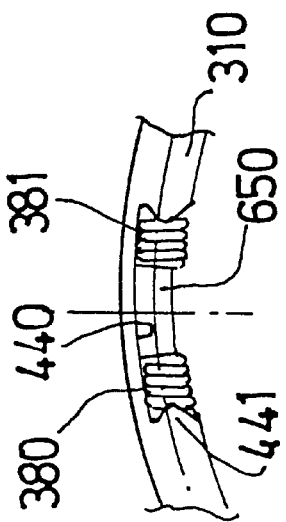

In order to reduce this friction, it is proposed, in FIGS. 15 and 16, to mount two take-up springs 380 and 381 by means of the notch 440. The springs 380, 381 are mounted on each side of an axially oriented lug 550, forming a tenon and replacing the lug 450 in FIGS. 10 to 14.

The lug 550 is therefore in a single piece with the adjustment ring 330 with ramps. In this case, the two lateral edges 451 of the lugs 550 and the two lateral edges 441 of the notch 440 have a pointed shape in order to hold the coil springs 380, 381 internally.

The springs 380, 381 are therefore mounted in opposition under prestressing, one of the springs 380, 381 expanding, whilst the other is compressed without the appearance of any clearance.

By virtue of this arrangement, the movement of the ring 330 with respect to the intermediate piece 310 is facilitated, without noise and without direct contact of the lug 550 with the lateral edges of the scallop 440. In addition, the torsion vibrations are damped and the friction is reduced.

Figure 17:
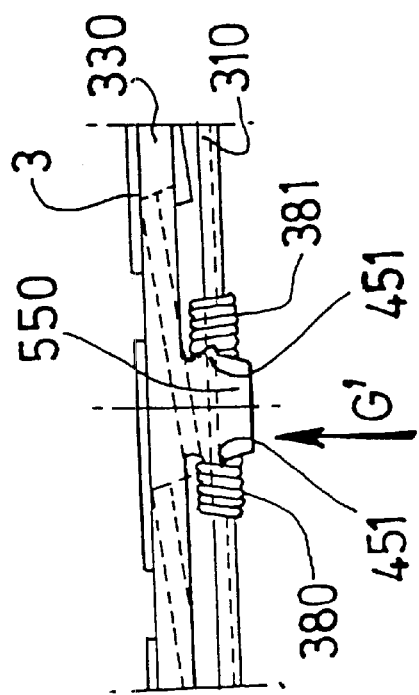
FIGS. 17 and 18 are views similar to FIGS. 13 and 14 for a fourth embodiment.
Figure 18:
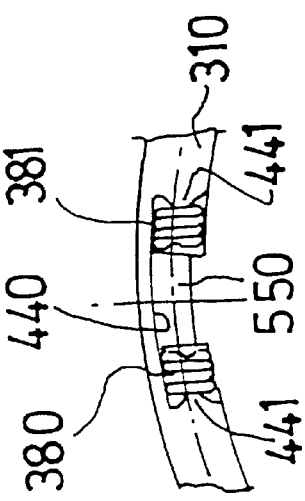
Figure 23:
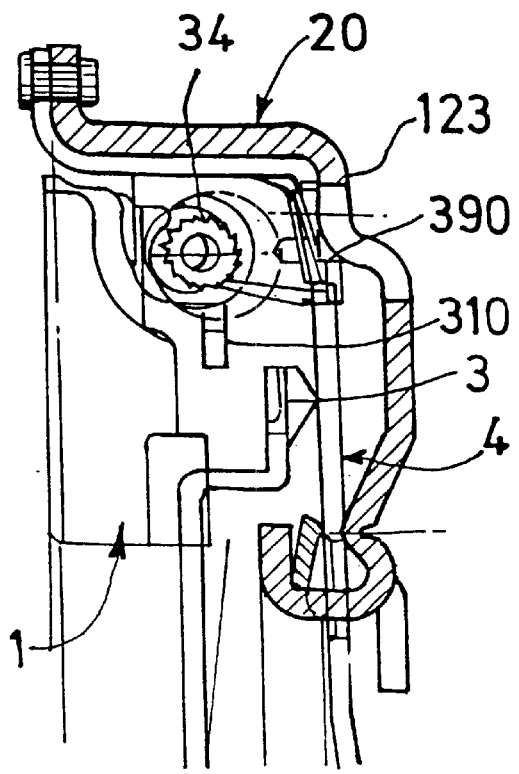
FIGS. 23 to 25 are views in section are views in section respectively along the lines A'—A', B'—B' and C'—C' in FIG. 22.
Figure 25:
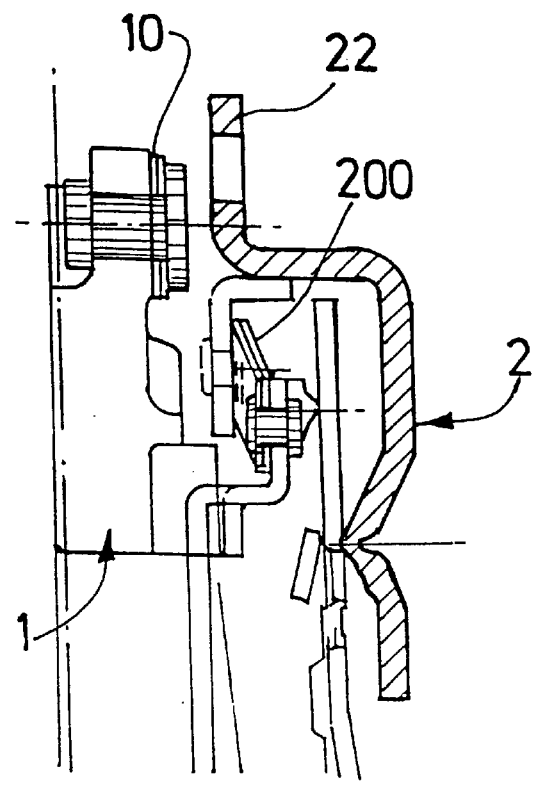
Figure 24:
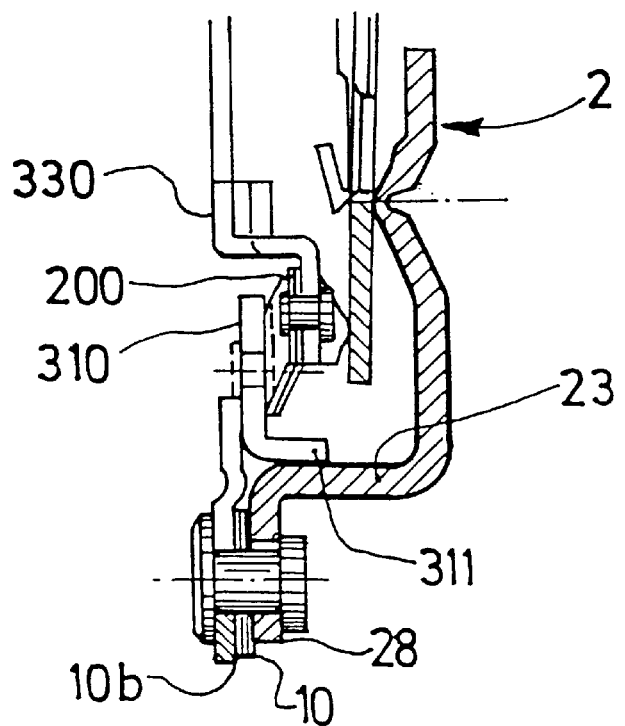

In a variant, FIGS. 17 and 18, the springs can be inclined in opposition, 380 381. In this case, the notch 440 is identical to that in FIG. 16. The lug 650 issuing from the adjustment ring is modified. The lateral edges 551 of this lug have a pointed shape in order to internally hold the springs 380, 381 mounted under prestressing.

Here the edges 551 are inclined so that the lug 650 has a trapezoidal shape with lateral edges 551 with a projecting point for holding the springs 380, 381.

By virtue of the inclination, an axial component is obtained forcing the one hand the intermediate piece in the direction of the pressure plate 1 and the protuberances 10a and on the other hand the ring 330 in the direction of the diaphragm.

This can be taken advantage of in order to omit the protuberances 10a on the tongues 10 closest to the diaphragm 4.

The intermediate piece no longer has any need to be gripped, its axial holding is effected by virtue of the springs 380, 381 axially forcing the intermediate piece in the opposite direction to the bottom of the cover 2 and the ring 330 in contact with the diaphragm 4.

Under these conditions, the protuberances 10a in the previous figures can be replaced with stop pieces 10b (FIGS. 19 to 21) which are rigid and distinct from the first tongues 10 thus simplified.

The stop pieces 10b are fixed to the cover by the same rivets for fixing the first tongues 10 to the cover 2. The pieces 10b are in the form of an annular sector at their internal periphery. As will have been understood, the thickness of the sub-assembly consisting of ring 330, springs 380, 381 and intermediate piece 310 decreases when the sub-assembly is mounted between the stops 10b and the diaphragm so that the ring is always in contact with the diaphragm.

In FIGS. 15 to 21, the ring 330 is rotatably connected to the intermediate piece 310, in the form of a ring or washer, by an elastic connection, by means of springs 380, 381 allowing an axial movement of the ring with respect to the intermediate piece.

As a variant, this connection can be effected by means of second axially elastic tongues allowing an axial movement of the ring 330 and permitting the formation of an assembly which can be handled and transported.

In a first embodiment, the second tongues 200 have a shape identical to the first tongues 10. It is therefore possible to use tongues of the standard type of a clutch mechanism of smaller size.

These tongues are therefore tangentially oriented overall and are fixed by means of fixing members at one of their ends to the adjustment ring 330 with ramps 32 and to the intermediate piece.

According to one characteristic the intermediate piece 310 and the ring 330 with ramps come from the same metal blank.

Thus, starting from a pressed metal sheet, the latter can form the ring 330 with ramps 32, and then the intermediate piece 310 is cut out, which thus surrounds the ring 330 without loss of material. This embodiment is therefore simple and economical.

It also makes it possible to centre the intermediate piece 310 with respect to the cover.

Thus in FIGS. 22 to 28 it can be seen that the intermediate piece 310 is a form of ring or washer provided at its external periphery with an axially oriented annular flange 311 interrupted by the set of teeth 31. This flange 311, possibly divided into lugs, is in intimate contact at its external periphery with the internal periphery of the skirt 23 of the cover 2 so that the intermediate piece 310 is centred at its external periphery with respect to the cover 2.

The tongues 200 are here fixed by riveting to brackets 312 on the intermediate piece 310 and to the ring 330, so that the pressure plate which is simplified because it no longer needs to be machined in order to form a centring surface for the ring 330. This is because, by virtue of the second tongues 200, axially elastic and tangentially oriented, the ring is centred with respect to the intermediate piece 310 surrounding the ring 330. Naturally in a variant the second tongues 200 can be curved in shape, that is to say in the form of an arc of a circle.

Brackets 312 are formed at the internal periphery of the intermediate piece 310 in the form of a ring. A clearance can be seen around the brackets 312, resulting from the final cropping of the intermediate piece. The ring 330 therefore has cutouts 313 at its external periphery in order to form the clearance around the brackets 312 and thus prevent interference, in particular with the rivets fixing the tongues.

By virtue of the divided support means 3, the heads of the fixing rivets 314, located between two annular sectors in the form of protrusions on the support means 3, do not extend in axial projection with respect to the ring 330 and therefore do not come into contact with the diaphragm.

In FIG. 22 a rigid stop piece 10b can be seen, identical to that in FIG. 20, except that in FIG. 22 the piece 10b forming a stop is not in contact with the cover but with the head of the rivet fixing the set of tongues 10 to the edge 22 of the cover.

Figure 28:
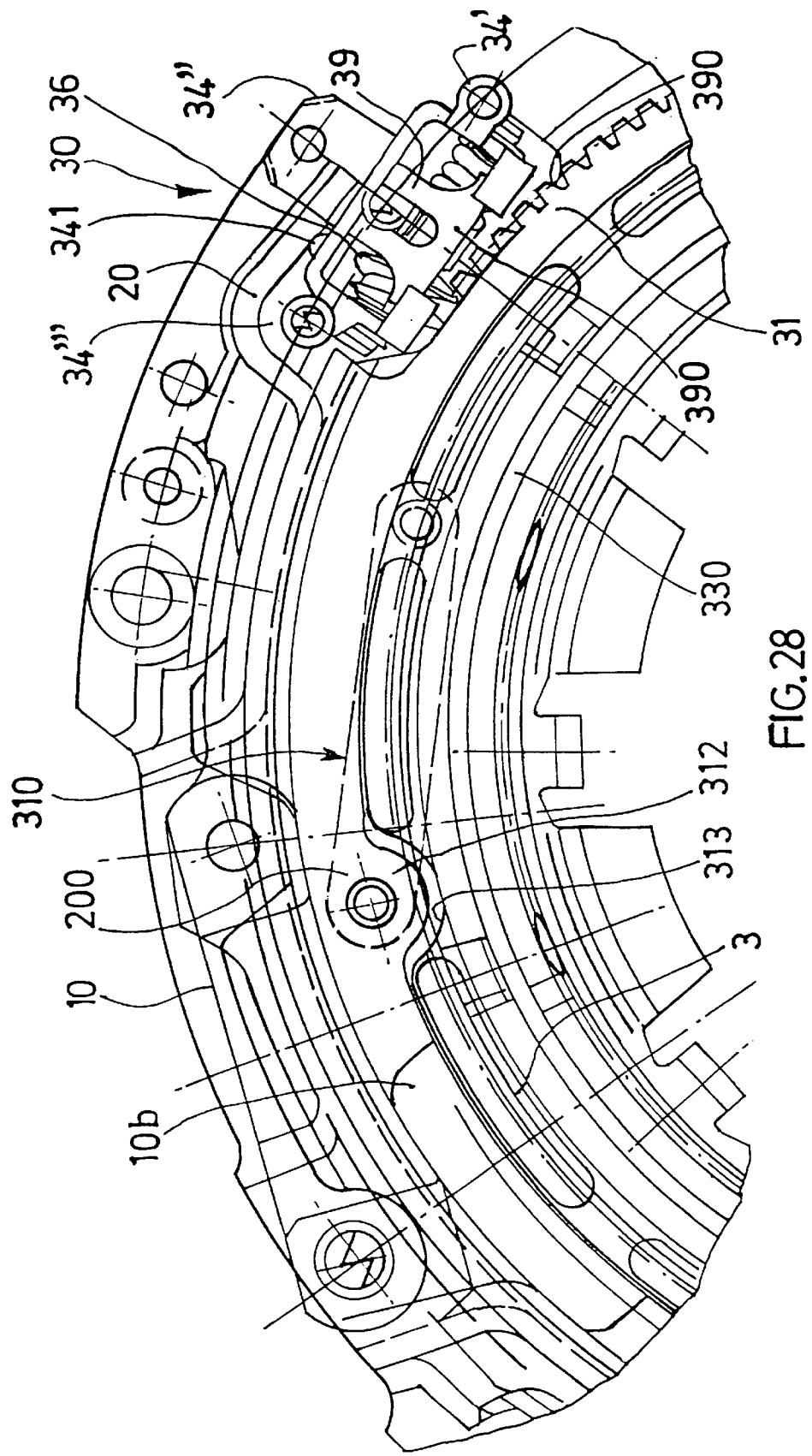
FIG. 28 is a view to a larger scale of the cartridge of FIG. 4.

In the two figures, the piece 10b has a peripheral part in the form of an inclined lug, connected by a fold to a central part in the form of a shoe, that is to say in the form of an annular sector for contact with the annular part of the intermediate piece 310. The peripheral part is thus offset axially with respect to the central part by means of the fold parallel to the set of first tongues by virtue of the inclination of the lug. The central part of the piece 10b extends without the set of tongues 10 and by virtue of the fold, the piece 10b is locked with respect to rotation by the tongues 10 (FIG. 28).

The second tongues 200 are fixed to the intermediate piece roughly radially below the fixing of the first tongues 10 to the pressure plate 1.

The number of first and second tongues 10 depends on the application. Here the second tongues 200 are located radially below the first tongues and alternate circumferentially with the central part of the pieces 10b. Between two housings 20, there is therefore a set of first tongues 10 and radially below the central part of the stop 10b and a set of second tongues 200.

In order to have a tangent contact between the worm 36 and the set of teeth 31 the axis of the screw is inclined as described in the aforementioned document FR 98/01453.

In this document, a problem is also posed since the screw is not tangent with respect to the set of teeth 31, which is desirable from the efficiency point of view.

To do this, the support 34 of the cartridge 30 carries a protrusion 341 able to cooperate with the contour of the housing 20.

The protrusion 341 is formed, in line with the screw 36, in the central web of the support 34 with a U-shaped cross-section.

The protrusion 341 cooperates with the internal periphery of the axially oriented apex of the housing 20 with a U-shaped cross-section overall. Naturally, the structures can be reversed, the protrusion being formed on the apex, constituting the central web of the housing 20.

As a result, compared with the embodiment in FIG. 1, the two fixing lugs 34", 34', disposed on each side of the central fixing lug 34", as can be seen in FIG. 28, have non-aligned centres. More precisely, use is made of the holes, for the passage of rivets fixing the fixing lugs, for fixing a normal cover in FIG. 1 and by virtue of the protrusion 341 the cartridge 30 is inclined to make the screw tangent to the set of teeth. As a variant new holes are created for a tangent contact of the screw with the set of teeth.

The support 34 is fixed here by riveting of the lugs 34, 34', 34" to the cover. Naturally, the intermediate piece 310 may not surround the ring 330 (FIGS. 29 to 32) and extend radially below the external periphery of the ring 330.

The second tongues 200 act, as in FIGS. 22 to 28, between the ring 330 and the piece 310 in order to rotatably connect the ring 330 to the piece 310 with the possibility of axial movement.

The tongues 200 are fixed at one of their ends, here by rivets 315, to the piece 310, and at their other end, here by rivets 314, to the ring 330.

More precisely, the second tongues 200 have a curved shape, in the form of an arc of a circle, whilst being axially elastic, and are fixed by means of rivets 314 to a lug 331 on the ring 330.

The lugs 331 extend between two sectors of the support means 3 whilst projecting radially outwards with respect to them.

Axially, the lugs 331 are offset axially towards the piece 310 and the plate 1 with respect to the support means 3, as in FIGS. 22 to 28, so that the heads of the rivets 314 do not interfere with the diaphragm.

The piece 310 is dished locally at the level of the rivets 315 (FIG. 31) so that the said rivets 315 do not extend in axial projection with respect to the face of the piece 310 turned towards the plate 1.

The piece 310 is therefore dished locally axially in the direction of the ring 330 for the fixing of the rivets 315.

In all cases, the piece 310 has a step at the level of the set of teeth 31 as well as an axially oriented annular flange extending at one of its external and internal peripheries. In FIGS. 22 to 28, the said flange 311 extends at the external periphery of the piece 310 for centring thereof with respect to the skirt 23 of the cover.

In FIGS. 29 to 32, the flange 321 extends at the internal periphery of the piece 310. The flange 311, 321 stiffens the intermediate piece.

In FIGS. 29 to 32, the ring 330 has, as in FIGS. 1 to 9, an annular flange 333 at its internal periphery. This flange 333 is axially oriented and cooperates through its external periphery with the internal periphery of the thicker part of the pressure plate carrying the studs 13 forming counter-ramps.

In FIGS. 22 to 28, the ring 330 has no such flange since it is centred by means of the flange 311 on the intermediate piece. In FIGS. 22 to 32, the intermediate piece 310 is offset axially with respect to the ring 330, in the direction of the pressure plate 1.

Naturally, the stops 10b can be joined together in order to form a ring and the take-up spring can be integrated into the second tongues.

Figure 32:
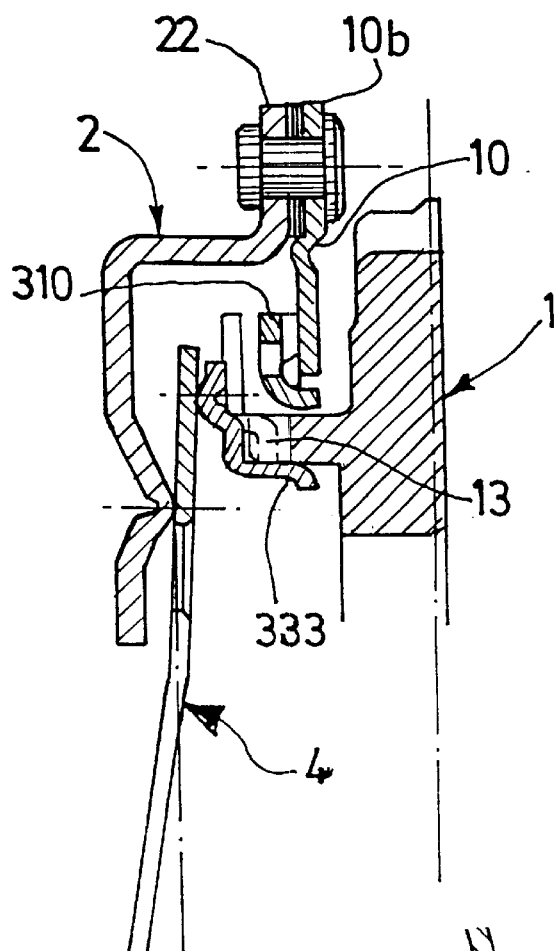
FIG. 32 is a view similar to FIG. 24 for this seventh example embodiment.
Figure 33:
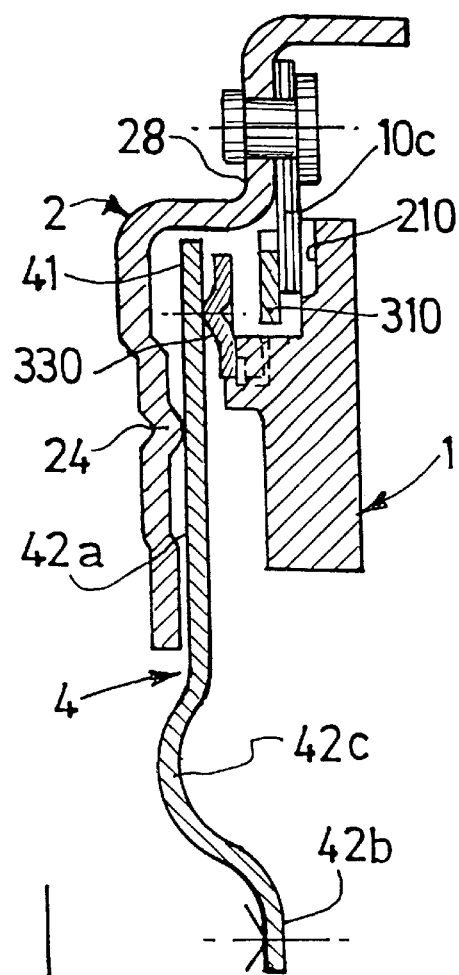
Figure 34:
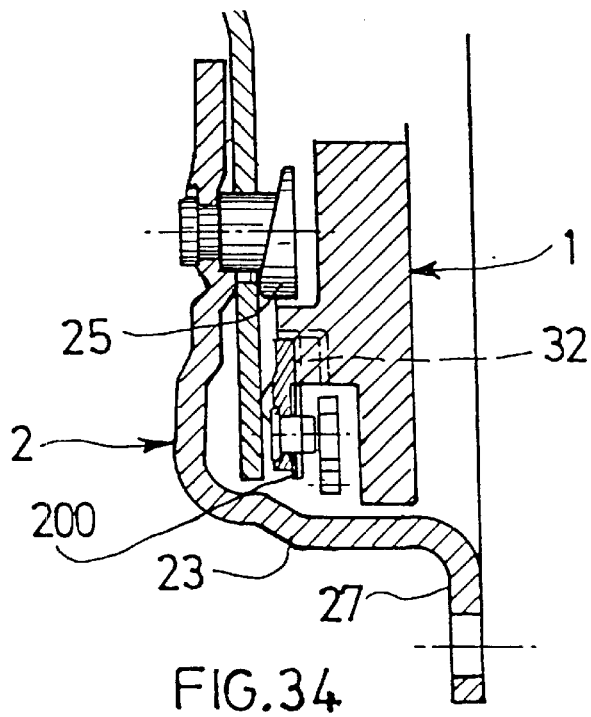

In the light of FIGS. 31 and 32, it can be seen that the intermediate piece 310 in the form of a ring is stiffened circumferentially by the ribs 316 each extending between two consecutive fixing rivets 315. It should be noted that the rivets 314 are located between two consecutive protrusions on the support means 3 and that the tops of the ramps 32 are located radially below protrusions, in the middle thereof, in order to stiffen the ring subjected to the action of the diaphragm.

It may be desirable to reduce the axial bulk of the clutch mechanism. It may also be desirable to simplify the intermediate piece 310 and the ring 330 with ramps. It may finally be desirable to reduce the axial bulk of the pressure plate 1.

To do this, in FIGS. 33 to 37, the diaphragm 4 is shaped so that its internal periphery is offset axially in the direction of the pressure plate with respect to its external periphery.

Thus the fingers 42 of the diaphragm have an external periphery 42a in the plane of the Belleville washer 41 of the diaphragm and an internal periphery 42b offset axially in the direction of the pressure plate 1 with respect to the external periphery 42b. A sinuous connecting portion 43b connects the peripheries 42a, 42b together. By virtue of this arrangement, the axial dimension between the engine and gearbox is reduced since the internal periphery 42b of the fingers enters the pressure plate 1 during the maneuvering of the clutch in order to disengage it.

The adjustment ring 330 is simplified since it has no flange at its external and internal periphery. The ring 330 has at its centre a pointed shape divided in order to form support means, in the form of an annular protrusion, for the diaphragm.

The ring 330 is connected by second tongues 200 to the intermediate piece 310 with a flat shape and therefore a simplified shape.

The axial retaining stop of the piece 310 consists of radial extensions 10c of the ends of the first tongues 10 to the areas 28 of the cover. The lateral edges of these areas 28 are connected together by a bridge 20' extending above the tongues 10 so that the cover is stiffened.

By virtue of the extensions 10c, the stop pieces 10b in FIGS. 22 to 32 are eliminated, which makes it possible to reduce the axial bulk of the clutch mechanism, as well as the number of parts.

In order to reduce the axial bulk still further, the pressure plate 1 is notched at 210, at the level of its rear face, so that the extensions 10c enter the notches 210 without interference. In FIGS. 38 to 41 the cartridge 30 is inclined so that the worm is tangent to the set of teeth 31 as in the embodiment in FIGS. 22 to 28. Thus the fixing lugs 34", 34' disposed on each side of the central lug 34" have non-aligned centres. The intermediate piece 310 and the ring with ramps 300 have a configuration of the type in FIG. 29 with stiffening flanges 321, 333. In this embodiment in FIGS. 38 to 41 second tongues are used. These second tongues 300 have a supplementary function. More precisely, at least one set of second tongues 300 is circumferentially elastic. This set, here of two tongues placed one on top of the other (FIG. 41), replaces the take-up spring so that the cartridge 30 is simplified since it has no such spring.

The cartridge 30 is therefore less bulky, as more clearly visible in FIG. 38, so that it is more economical particularly because its support requires less material.

Here all the sets of tongues 300 are circumferentially elastic and naturally axially elastic. To do this the second tongues 300 have at least one fold, here in the form of a corrugation. Here the tongues 300 are folded like a concertina, the number of folds depending on the application and the required circumferential elasticity.

In this embodiment the tongues 300 have corrugations of different magnitudes (FIG. 38).

In this way the number of parts is reduced because of the elimination of the take-up spring in the cartridge 30. In addition the risks of jamming are reduced because several sets of second tongues 300 are provided so that the ring 330 can turn during a wear take-up operation in a sure fashion.

To reduce still further the number of parts, the stop pieces are joined together in order to form a stop ring 10d with lugs for fixing to the areas 28. This ring 10d serves as a support for the intermediate piece 310 and replaces the sectors 10b. As can be seen in FIG. 38 the support for the cartridge 30 has two high stops for limiting the movement of the elastic member 39, extending below the central web of the U-shaped support 34. The high stops are produced by 90° folds extending in the bottom part of the lateral wings of the supports, these stops being adjacent to the bottom of the cover.

The elastic member 39 extends below the central web of the support whilst being in contact with the bottom face of the said web.

In the previous figures the intermediate part has an annular shape but naturally the intermediate piece 310 can be reduced to a toothed sector 31 connected by a second elastic tongue to the ring with ramps. Such an assembly consisting of second tongue 400 and toothed sector 310 is visible in FIGS. 42 and 43.

This arrangement improves the meshing of the worm 30 and set of teeth 31 at a high speed of rotation since the sector 310 is elastically connected to the cover by the curved-shaped tongue 400 (in the form of an annular sector).

This arrangement can block the wear take-up at very high rotation speeds in order in particular to eliminate excessive take-up related to vibration at very high speeds of rotation. In these figures the intermediate piece is elastically suspended by means of the second tongue.

In the previous figures a single housing 20 was used for mounting the cartridge 30.

In FIGS. 44 to 47 the other two housings are used for mounting pieces 10f forming an axial stop for the intermediate piece 310. The piece 10f centres the intermediate piece 310, which for this purpose is in intimate contact through its external periphery with the internal periphery of an axially oriented portion which each piece 10f has in the form of a hook for axially retaining the intermediate piece.

The pieces 10f therefore have a radially oriented stop portion radially directed towards the inside for contact with the face of the intermediate piece 310 directed in the opposite direction to the bottom of the cover.

The stop pieces 10f are therefore in the form of an angle bracket. Here each piece 10f has a fixing lug connected to the free end of the axial portion of the piece 10f. The fixing lug extends radially overall towards the outside and is fixed to the bottom 123 of the housing 20 by at least one rivet, which is here a rivet, which is here a balancing rivet 201'. The housings 20 are here all identical so that the bottoms 123 are provided with a window. The pieces 10f also form balancing masses. The lateral wings of the support 34 each have a lug 10e directed radially towards the inside in order to serve as an axial stop for the intermediate piece in association with the pieces 10f. The support 34 therefore has an additional function, and this in a simple and economical fashion. In this embodiment the housings are used for mounting the axial stops 10f, 10e for holding the intermediate piece 310. One of the high stops has been referenced at 10g, the support in FIG. 42 being identical to that in FIGS. 44 to 47.

In all cases the intermediate piece is in rubbing contact with at least one axial stop 10a, 10b, 10d, 10f, 10e axially retaining the intermediate piece in one direction, namely in the direction going from the bottom of the cover 2 to the pressure plate 1, the intermediate piece 310 being in contact with the face of the said stop turned towards the bottom of the cover.

In the other axial direction the other intermediate piece is either retained by an extension 10a (FIG. 9), or by the diaphragm via the ring 3 and the second tongues.

In all the figures the elastic member is located radially below the central web of the U-shaped support 34.

As a variant the elastic member 39 is located radially above the support 34 whilst being in contact with the top face of the central web 134 of the support 34, which makes it possible to extend the control tongue 390 of the elastic member 39. A radial clearance exists between the housing 20 and the member 39 fixed by riveting to the central web 134 of the support 34.

More precisely the radial clearance exists between the deformation of the skirt of the cover forming the top of the housing (see FIG. 3) of the cartridge 30, and the rivet 234 for fixing the member 39 is made by extrusion of the web 134 so that it extends in projection with respect to the member 39 over a small height e (FIG. 48), which is advantageous for reducing the bulk.

In this FIG. 48 it can be seen that the distance h is well controlled when the clutch is engaged. The elastic member is therefore fixed at two points, namely at the level of the central lug 34' and fixing of the support 34 and at the level of the rivet 234.

The shaft 35 is provided, in the embodiment in FIGS. 48 to 51, with a cylindrical head 135, a barrel 235 with a diameter D less than that of the head 135 and an end tail 335 with a diameter less than that of the barrel 235. The assembly consisting of worm 36 and ratchet wheel 37 is mounted so as to slide along the barrel 235 extending axially between the two wings 334 of the support 34. The take-up spring 38 is mounted around the barrel 235 and bears on the head 135 passing for this purpose through a hole 336 in the relevant wing 334. The shaft 35 is locked axially on the other wing 334 by virtue of its tail 335 bearing through its shoulder, formed by means of the change in diameter of the connection of the tail 335 with the barrel 235, on the internal face of the flange 334 and through the end of the tail 335, which is crushed after the tail 335 passes through an opening 335 produced in the said flange. Naturally the diameter of the opening 337 is less than that of the opening 336.

The take-up spring 38 is calibrated, that is to say prestressed accordingly in order to keep the screw 337 in abutment on the adjacent wing 334. Thus, in this embodiment, the assembly consisting of wheel 37 and screw 36 is slipped onto the barrel 235 and the spring 38 no longer bears on the adjacent wing 334 so that the said wing has no need to be treated. In addition the elastic member 39 is simplified and has a greater length. For more information on the prestressing of the take-up spring 38, reference should be made to the document FR 98 16456 filed on Dec. 29, 1998. This prestressing makes it possible to have a relative movement between the screw 36 and the set of teeth 31 only during a wear take-up operation, which makes it possible to reduce wear. When the control tongue 39 has skipped a tooth on the ratchet wheel 37, the assembly consisting of ratchet wheel 37 and worm 36 is caused to turn only during the operation of reclutching or re-engaging the clutch. During this phase the spring 38 remains under prestressing, this being such that the spring 38 is not compressed overall. During an operation of disengaging the clutch the screw 36 cannot turn because of the spring 38.

Naturally all combinations are possible.

Figure 42:
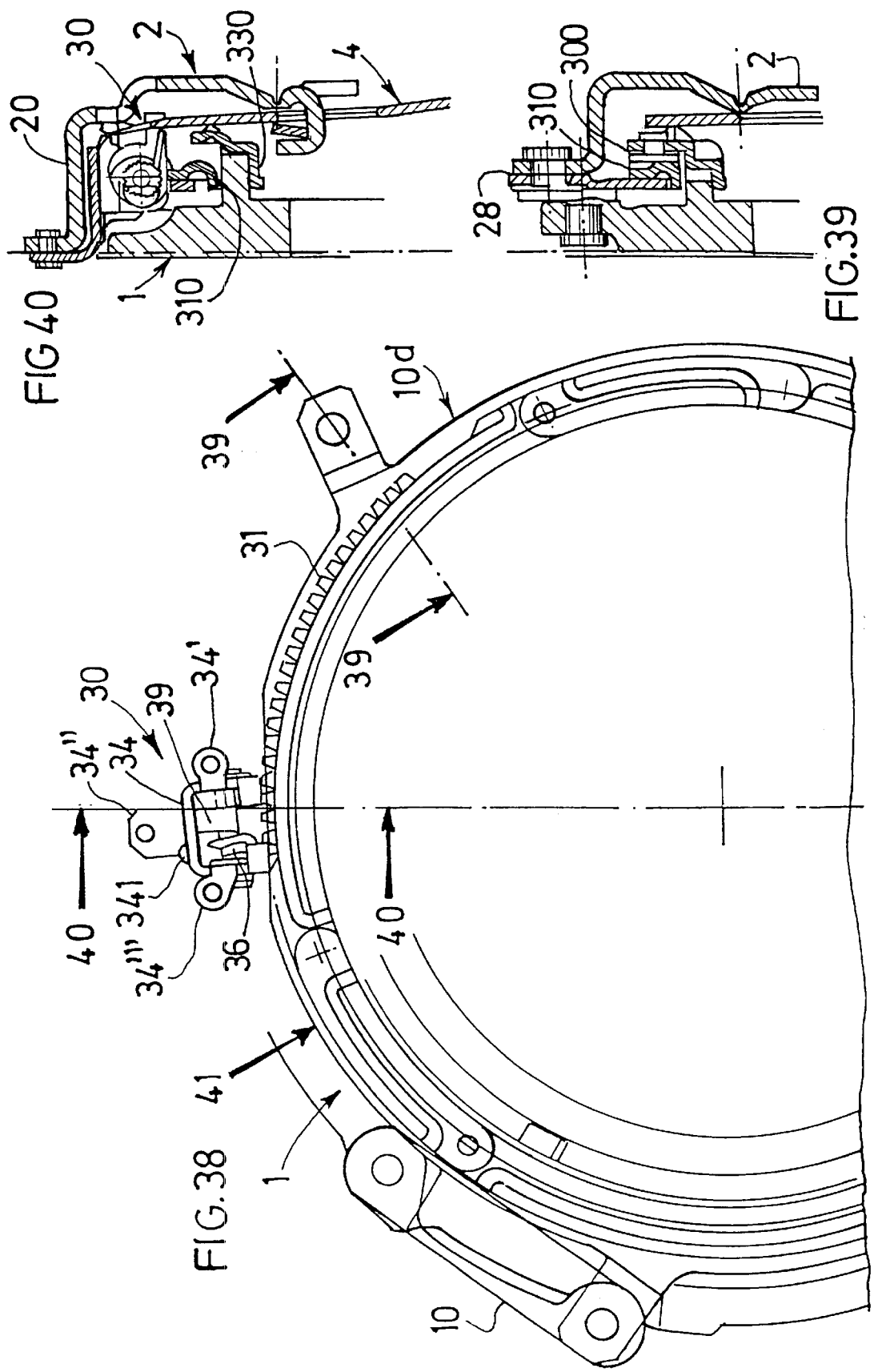
FIG. 42 is a partial view similar to FIG. 2 for a tenth example embodiment.
Figure 43:
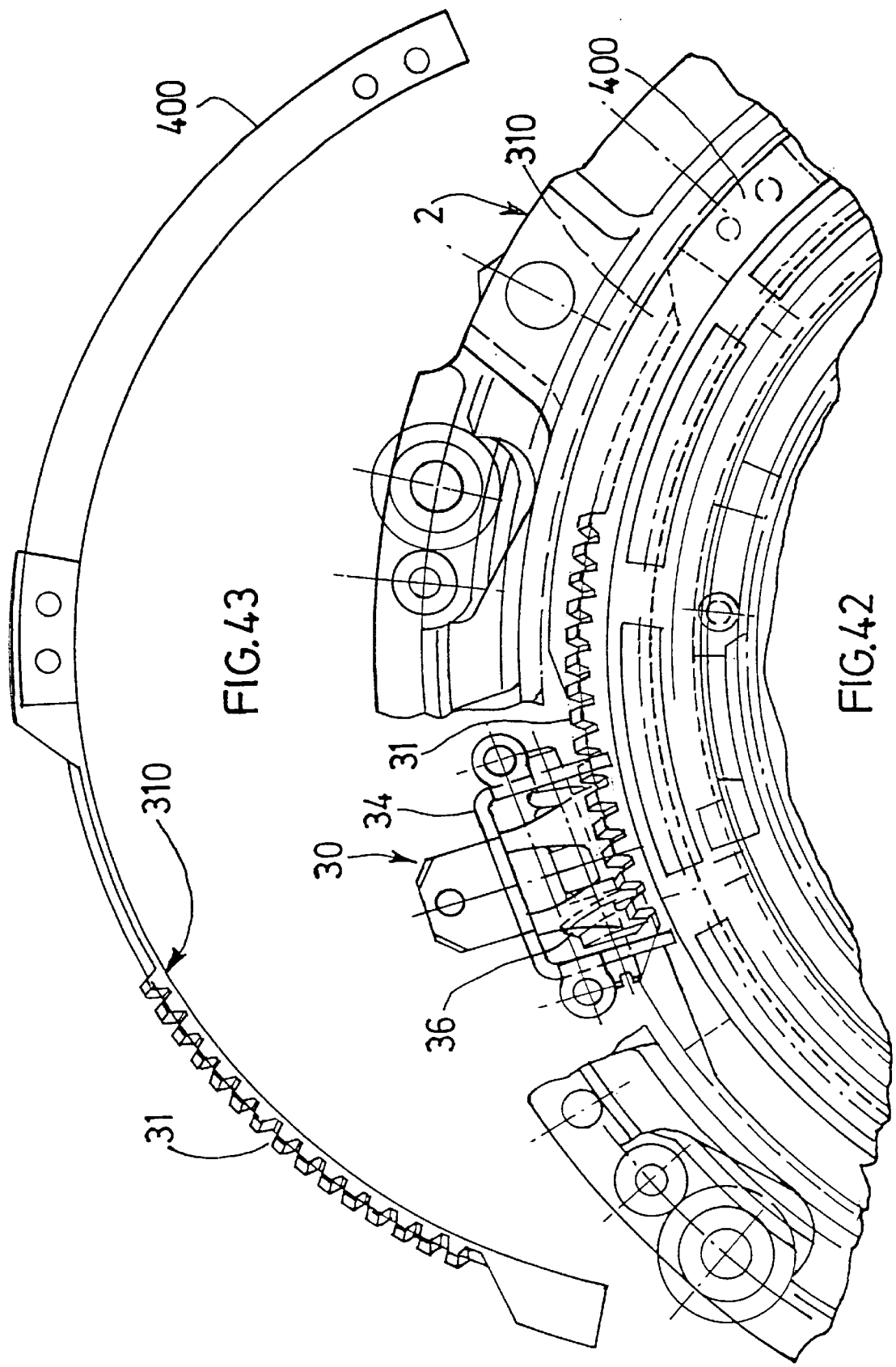
FIG. 43 is a view showing the intermediate piece and the second tongue in FIG. 42.

It should be noted that the pressure plate has a recess flat at the level of the cartridge 30, as can be seen for example in FIG. 42, and that the set of teeth 31 is located in the bottom of a recess or scallop in the intermediate piece 310 so that the set of teeth extends radially below the external periphery of the intermediate piece. All this is designed so that the worm 36 comes into engagement in a sure manner with the set of teeth 31 whilst reducing the transverse bulk.

In FIG. 30 it is possible to protect the second tongues 200 when the sub-assembly consisting of intermediate piece 310, tongues 200 and ring with ramps 330 is not yet mounted within the clutch. To do this it suffices to mount removable clips 1000 on the ring 330 and the intermediate piece 310.

Figure 44:
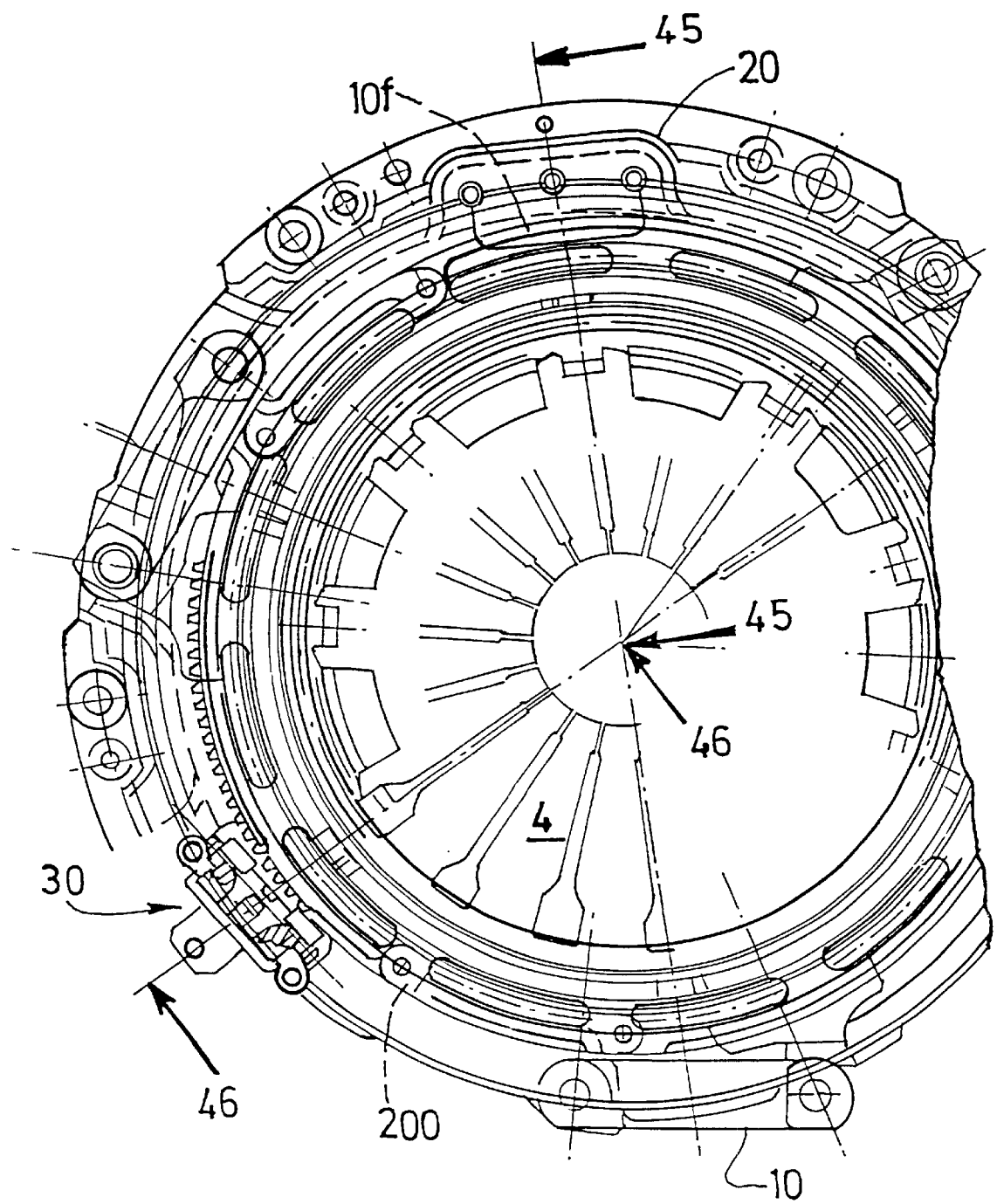
FIG. 44 is a partial view similar to FIG. 1 for an eleventh example embodiment.
Figure 47:
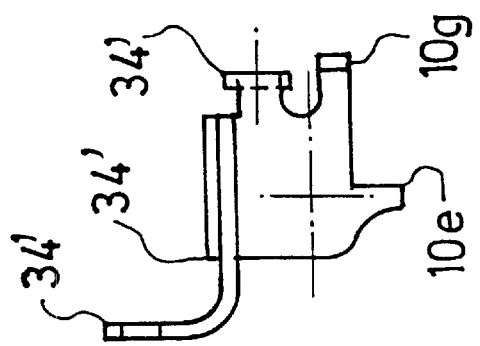
FIG. 47 shows the support of the cartridge in FIG. 46.
Figure 46:
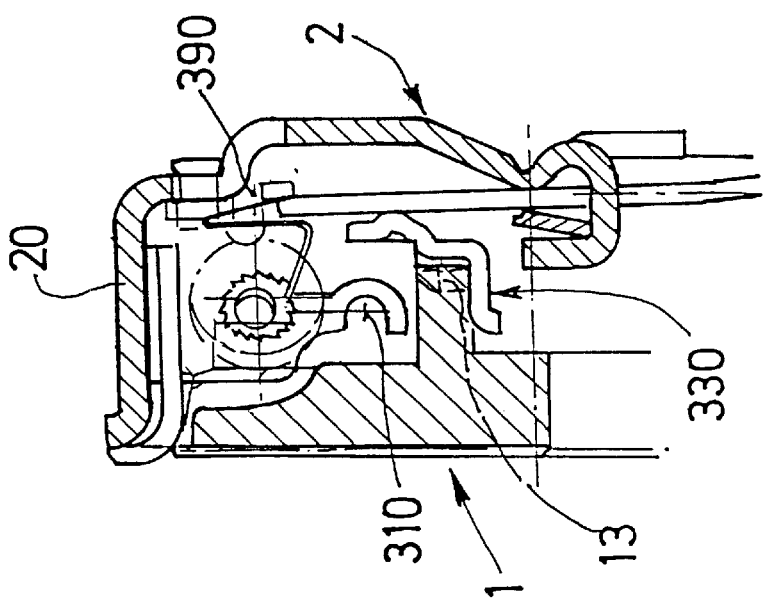
FIGS. 45 and 46 are views respectively along the lines 45—45 and 46, 47 in FIG. 44.
Figure 45:
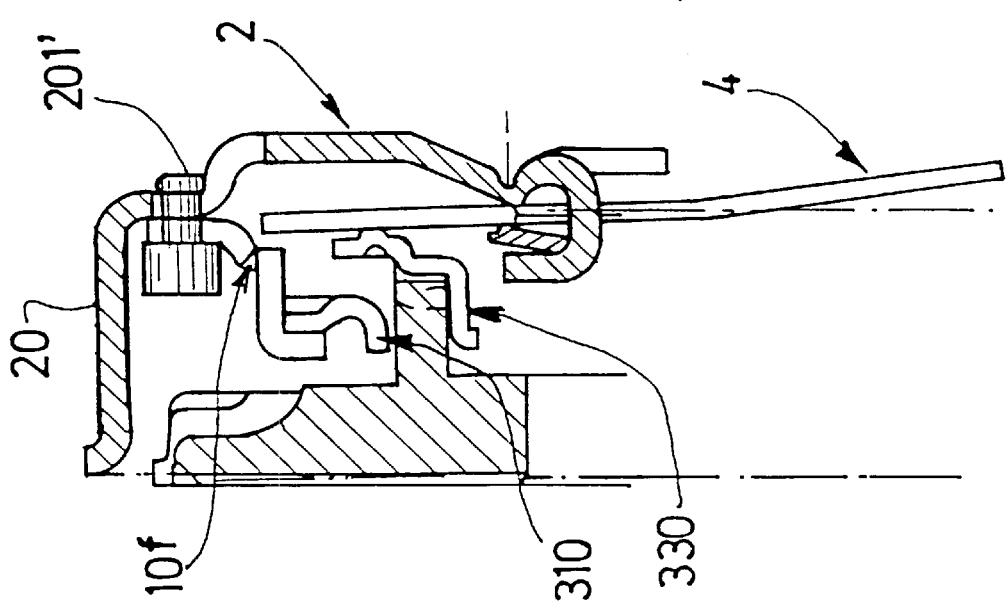

It should be noted that the balancing pieces 10f in FIG. 44 are fixed by three rivets 201' to the bottom 123 of the housing 20. The pieces 10b, in a variant, are connected together at their internal periphery in order to form a ring extended at its external periphery by lugs for fixing to the cover. In this case the end of the tongues, intended to be fixed to the cover, are interposed between the lugs on the ring 10b and the cover, here areas thereof. All combinations are possible, and thus in FIG. 9 at least one of the protuberances 10a can be replaced by a rigid piece 10b of the type in FIG. 22.

In the embodiment in FIGS. 48 to 51, a protrusion of the same type as the protrusion 341 in FIG. 38 can be provided. In FIG. 38 and in these FIGS. 48 to 51 it is possible to provide, on the other side of the lug 34", a second protrusion on the central web of the support. This second protrusion, depicted at 341' in FIG. 52, can be less high than the protrusion 341. Thus, under the effect of centrifugal force, this second protrusion is allowed to come into contact with the internal periphery of the top of the housing 20. The protrusions 341, 341' are advantageously obtained by pressing. The cartridge in FIGS. 48 to 52 is therefore particularly economical.

As a variant, instead of having lugs 34' and 34" which are different as in FIG. 40, it suffices to incline the bottom 123 of the housing so that the worm is tangent to the set of teeth 31 forming a rack, whilst having a cartridge 30 with lugs as in FIG. 8.

The high stop or control stop for the tongue 390 can come from the cover 2, as described in the document FR 98 165 47 filed on Dec. 29, 1998.

By virtue of the second tongues, a sub-assembly mounted under prestressing between the diaphragm and the stop or stops is formed with the intermediate piece and the ring with ramps.

By virtue of the prestressing of the tongues the thickness of this sub-assembly decreases when it is mounted between the diaphragm and the stop or stops. The ring is always in abutment on the diaphragm.

What is claimed is:

1. Clutch mechanism, for a motor vehicle having a cover (2) provided with a transversely oriented bottom (21) with a central hole, a pressure plate (1) having on the front a friction plate (11) for cooperation with a friction disc (101) provided with at least one friction lining and carrying support means (3) on the back, means (10) for rotatably connecting the pressure plate (1) to the cover (2) whilst allowing an axial movement of the pressure plate (1) with respect to the cover (2), engagement means (41) bearing on the cover (2) for action on the support means (3), disengagement levers (42) pivotally mounted on the cover (2) for action on the engagement means, and a device for taking up wear in said at least one friction lining of the friction disc (101), in which the wear take-up device has an actuator (410) fixed to the engagement means (41) and intended to drive a worm (36) carried by the cover (2), the said worm

(36) cooperating with a set of teeth (31) associated with a ring (330) with ramps (32) cooperating with counter-ramps (13) carried by the pressure plate (1), characterised in that the set of teeth (31) belongs to an intermediate piece (310) rotatably connected to the ring (330) with ramps (32) by means of a connection (340, 350) allowing an axial movement of the ring (330) with ramps (32) with respect to the intermediate piece (340).

2. Mechanism according to claim 1, characterised in that the intermediate piece (310) is arranged in the cover (2) in a manner which is axially fixed overall.

3. Mechanism according to claim 1, characterised in that at least one stop piece (10a, 10b, 10c, 10e, 10f) is carried by the cover (2) for contact with the intermediate piece (310) and axial holding thereof in the axial direction going from the cover (2) to the pressure plate.

4. Mechanism according to claim 3, characterised in that several stop pieces (10a, 10b, 10c, 10e, 10f) are provided.

5. Mechanism according to claim 4, characterised in that the pieces of the stops (10a, 10b, 10c) are in the form of an annular sector at their internal periphery.

6. Mechanism according to claim 4, characterised in that the pieces of the stops (10a, 10b, 10c, 10e) are each fixed by means of at least one lug for fixing to the cover.

7. Mechanism according to claim 6, characterised in that at least one of the fixing pieces (10e, 10f) is mounted in a housing (20) formed as a thicker part at the external periphery of the cover (2).

8. Mechanism according to claim 7, characterised in that the stop piece (10f) is a balancing piece.

9. Mechanism according to claim 8, characterised in that the balancing piece is in the form of an angle bracket having a radially oriented portion directed radially towards the inside forming a stop for the intermediate piece (310), the said radial portion being extended by an axially oriented portion at the free end of which the fixing lug is connected to the cover directed radially outwards.

10. Mechanism according to claim 8, characterised in that the stop piece (10f) belongs to a support (34) carrying the worm (36), in that the support (34) has a U shape with two lateral wings and in that at least one of the wings has a lug (10f) directed radially towards the inside in order to form an axial stop for the intermediate piece.

11. Mechanism according to claim 1, characterised in that the intermediate piece (310) is gripped axially between two protuberances (10a) fixed to the cover (2).

12. Mechanism according to claim 11, characterised in that the protuberances (10a) belong to first axially elastic tongues (10) rotatably connecting the pressure plate (1) to the cover (2) with axial mobility.

13. Mechanism according to claim 12, characterised in that the first tongues (10) are tangentially oriented whilst being fixed at their first end to the cover (2) and in that the protuberances (10a) extend the first end of the tongues (10).

14. Mechanism according to claim 3, characterised in that the stop piece consists of a ring having lugs for fixing it to the cover.

15. Mechanism according to claim 1, characterised in that the ring (330) with ramps (32) is rotatably connected by cooperation of shapes with the intermediate piece (310).

16. Mechanism according to claim 1, characterised in that one of the elements amongst ring (330) with ramps (32) and intermediate piece (310) has lugs (350) entering scallops (340) in the other one of the elements amongst intermediate piece (310) and ring (330) with ramps (32).

17. Mechanism according to claim 16, characterised in that the ring (330) has axially oriented lugs (350) passing through scallops (340) in the intermediate piece.

18. Mechanism according to claim 17, characterised in that the lugs (350) pass through the scallops (340) with circumferential mounting clearance.

19. Mechanism according to claim 17, characterised in that the lugs (450, 550, 650) have a circumferential width less than that of the scallops (440).

20. Mechanism according to claim 19, characterised in that a take-up spring (380) bears at one of its ends on a first lateral edge (441) of a scallop (340) and at its other end on a first lateral edge (551) of the lug (450, 550, 650) of the ring (330) with ramps (32).

21. Mechanism according to claim 20, characterised in that the take-up spring (380) forces the second lateral edge of the lug (450) in contact with the second lateral edge of the scallop (440).

22. Mechanism according to claim 20, characterised in that a second take-up spring (381) acts between the second lateral edge of the lug (550, 650) and the second lateral edge of the scallop (440) so that the two take-up springs (380, 381) are mounted on each side of the lug (550, 650).

23. Mechanism according to claim 22, characterised in that the two take-up springs (380, 381) are mounted in opposition under prestressing.

24. Mechanism according to claim 22, characterised in that the take-up springs (380, 381) are inclined.

25. Mechanism according to claim 20, characterised in that the first lateral edges respectively of a lug (450, 550, 650) and of a scallop (440) have a point for holding the take-up springs in the form of coil springs.

26. Mechanism according to claim 22, characterised in that the second lateral edges respectively of a lug (550, 650) and of a scallop (440) have a point for holding take-up springs in the form of a coil spring.

27. Mechanism according to claim 23, characterised in that the worm (36) is carried by a support (34) fixed to the cover (2) and in that the take-up spring (380, 381) is mounted outside the support (34).

28. Mechanism according to claim 1, characterised in that the intermediate piece has an annular shape.

29. Mechanism according to claim 1, characterised in that the ring (330) with ramps (32) is rotatably connected to the intermediate piece (310) by at least one second axially elastic tongue (200, 300) allowing an axial movement of the ring (330).

30. Mechanism according to claim 1, characterised in that the intermediate piece (310) surrounds the adjustment ring (330).

31. Mechanism according to claim 30, characterised in that the intermediate piece (310) and the ring (300) with ramps (32) are made from the same metallic blank.

32. Mechanism according to claim 30, characterised in that the intermediate piece (310) has at its external periphery an axially oriented annular flange, possibly divided, for intimate contact of the intermediate piece (310) with the internal periphery of an annular skirt (23) of roughly axial orientation belonging to the cover (2).

33. Mechanism according to claim 30, characterised in that the intermediate piece (310) has brackets (312) at its internal periphery and in that the ring has cutouts (313) at its external periphery for forming a clearance around the brackets (312).

34. Mechanism according to claim 33, characterised in that several second tongues (200) are provided and in that the brackets (312) serve for fixing the second tongues (200).

35. Mechanism according to claim 34, characterised in that the second tongues (200) are fixed to the ring (300) with ramps (32) between two annular sectors on the support means (3).

36. Mechanism according to claim 1, characterised in that the ring (330) with ramps (32) has no flange at its external and internal peripheries and has at the centre a pointed shape divided to form support means.

37. Mechanism according to claim 36, characterised in that several second tongues (200) are provided and in that the intermediate piece (310) consists of a flat ring.

38. Mechanism according to claim 28, characterised in that the ring (300) with ramps (32) has at one of its internal and external peripheries an axially oriented annular flange (333) for cooperation with the pressure plate and centring of the ring.

39. Mechanism according to claim 38, characterised in that the intermediate piece (310) has an axially oriented annular flange (321).

40. Mechanism according to claim 29, characterised in that the intermediate piece is reduced to a toothed sector connected by a second tongue (300) to the ring (300) with ramps (32).

41. Mechanism according to claim 28, characterised in that the second tongue or tongues (200, 300) have a curved shape.

42. Mechanism according to claim 28, characterised in that the second tongue or tongues (200, 300) extend tangentially.

43. Mechanism according to claim 29, characterised in that the second elastic tongue or tongues (300) are circumferentially elastic.

44. Mechanism according to claim 43, characterised in that the second tongue or tongues (300) have at least one fold.

45. Mechanism according to claim 44, characterised in that the fold is in t he form of a corrugation.

46. Mechanism according to claim 45, characterised in that the second tongue or tongues (300) are folded like a concertina with at least two corrugations of different magnitudes.

47. Mechanism according to claim 29, characterised in that at least one removable clip (1000) acts between the intermediate piece (310) and the ring (330) with ramps (32) in order to limit the axial separation between the intermediate piece (310) and the ring with ramps (330) before mounting these within the clutch mechanism.

48. Mechanism according to claim 43, characterised in that the endless screw (36) is mounted in a support (34) fixed at the external periphery of the cover (2) and in that second tongues (300) constitute a take-up spring intended to cause the ring (330) with ramps (32) to turn.

49. Mechanism according to claim 1, characterised in that the set of teeth (31) is formed in the bottom of a recess produced at the external periphery of the intermediate piece (310).

* * * * *